US011916709B2

(12) United States Patent
Marinier et al.

(10) Patent No.: US 11,916,709 B2
(45) Date of Patent: Feb. 27, 2024

(54) DETERMINATION OF A SIGNAL STRUCTURE IN A WIRELESS SYSTEM

(71) Applicant: InterDigital Patent Holdings, Inc., Wilmington, DE (US)

(72) Inventors: Paul Marinier, Brossard (CA); J. Patrick Tooher, Montreal (CA); Tao Deng, Roslyn, NY (US); Benoit Pelletier, Roxboro (CA); Ghyslain Pelletier, Montreal (CA); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/080,420

(22) PCT Filed: Mar. 9, 2017

(86) PCT No.: PCT/US2017/021504
§ 371 (c)(1),
(2) Date: Aug. 28, 2018

(87) PCT Pub. No.: WO2017/156224
PCT Pub. Date: Sep. 14, 2017

(65) Prior Publication Data

US 2019/0081832 A1 Mar. 14, 2019

Related U.S. Application Data

(60) Provisional application No. 62/306,445, filed on Mar. 10, 2016, provisional application No. 62/372,984,
(Continued)

(51) Int. Cl.
*H04L 27/26* (2006.01)
*H04L 5/00* (2006.01)
*H04W 74/00* (2009.01)

(52) U.S. Cl.
CPC .......... *H04L 5/0007* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS 8,913,479 B2 12/2014 Bhushan et al.
9,143,304 B2 9/2015 Lee et al.
(Continued)

FOREIGN PATENT DOCUMENTS

CN 201510965378.X * 12/2015
EP 3442141 A1 2/2019
(Continued)

OTHER PUBLICATIONS

3rd Generation Partnership Project (3GPP), R1-155964, "Technical Considerations on Subcarrier Spacing", Huawei, HiSilicon, 3GPP TSG RAN WG1 Meeting #82bis, Malmo, Sweden, Oct. 5-9, 2015, 4 pages.
(Continued)

*Primary Examiner* — Jenkey Van
(74) *Attorney, Agent, or Firm* — Jamie T. Nguyen

(57) ABSTRACT

Systems, methods, and instrumentalities are for identifying, determining, or selecting one or more numerologies in a wireless system. The numerologies may include one or more of a subcarrier spacing, a transmission duration, a symbol duration, a number of symbols, or a cyclic prefix (CP) size. The WTRU may send an access request indicating the identified, determined, or selected one or more numerologies. The access request may be a random access channel (RACH) request or a scheduling request (SR). The WTRU may monitor one or more search spaces for one or more
(Continued)

100
102a 102b 102c 102d
115/116/117
103/104/105 RAN
114a 114b
106/107/109 Core Network
108 PSTN
110 Internet
112 Other Networks
102
122
120 Transceiver
124 Speaker/ Microphone
126 Keypad
128 Display/ Touchpad
118 Processor
134 Power Source
136 GPS Chipset
138 Peripherals
130 Non-Removable Memory
132 Removable Memory physical control channels. The search spaces may be monitored based on an identified, determined, or selected one or more numerologies. Within one of the search spaces, the WTRU may receive and successfully decode a physical control channel. The WTRU may transmit data based on the numerology associated with the search space in which the physical channel was successfully decoded.

14 Claims, 7 Drawing Sheets

Related U.S. Application Data filed on Aug. 10, 2016, provisional application No. 62/400,739, filed on Sep. 28, 2016.

(52) U.S. Cl.
CPC .... *H04L 27/26025* (2021.01); *H04L 27/2646* (2013.01); *H04W 74/004* (2013.01); *H04W 74/0841* (2013.01)

(56) References Cited

U.S. PATENT DOCUMENTS

| | | | | |
|---|---|---|---|---|
| 9,716,579 | B2 | 7/2017 | Azizi et al. | |
| 10,285,146 | B2 | 5/2019 | Urabayashi et al. | |
| 10,616,020 | B2 | 4/2020 | Lee et al. | |
| 10,715,373 | B2 * | 7/2020 | Kim | H04L 27/2666 |
| 10,728,852 | B2 | 7/2020 | Zhang et al. | |
| 10,868,643 | B2 | 12/2020 | Boudreau et al. | |
| 2009/0083424 | A1 | 3/2009 | Frederiksen et al. | |
| 2013/0083749 | A1 | 4/2013 | Xu et al. | |
| 2013/0176952 | A1 | 7/2013 | Shin et al. | |
| 2013/0242906 | A1 | 9/2013 | Li et al. | |
| 2014/0086173 | A1 | 3/2014 | Sadeghi et al. | |
| 2014/0105164 | A1 | 4/2014 | Moulsley et al. | |
| 2014/0192740 | A1 | 7/2014 | Ekpenyong et al. | |
| 2014/0321406 | A1 | 10/2014 | Marinier et al. | |
| 2015/0071050 | A1 | 3/2015 | Iranzo et al. | |
| 2015/0172017 | A1 | 6/2015 | Wu et al. | |
| 2015/0365926 | A1 | 12/2015 | Long | |
| 2015/0365977 | A1 * | 12/2015 | Tabet | H04J 13/0062 370/330 |
| 2016/0021661 | A1 | 1/2016 | Yerramalli et al. | |
| 2016/0029331 | A1 | 1/2016 | Seo et al. | |
| 2016/0294498 | A1 * | 10/2016 | Ma | H04L 27/2647 |
| 2017/0245165 | A1 * | 8/2017 | Onggosanusi | H04L 5/0057 |
| 2017/0272295 | A1 | 9/2017 | Lee et al. | |
| 2017/0279522 | A1 | 9/2017 | Yi et al. | |
| 2017/0318598 | A1 | 11/2017 | Islam et al. | |
| 2017/0359791 | A1 | 12/2017 | Onggosanusi et al. | |
| 2018/0048511 | A1 | 2/2018 | Hakola et al. | |
| 2018/0184413 | A1 * | 6/2018 | Rong | H04W 28/0247 |
| 2018/0191473 | A1 * | 7/2018 | Ashraf | H04L 5/0064 |
| 2018/0198649 | A1 * | 7/2018 | Lindoff | H04L 27/264 |
| 2018/0199341 | A1 * | 7/2018 | Baldemair | H04L 27/264 |
| 2018/0206271 | A1 * | 7/2018 | Chatterjee | H04L 5/0053 |
| 2018/0220465 | A1 * | 8/2018 | Zhang | H04L 1/0013 |
| 2018/0255586 | A1 * | 9/2018 | Einhaus | H04L 27/0006 |
| 2018/0279388 | A1 | 9/2018 | Miao et al. | |
| 2018/0376439 | A1 * | 12/2018 | Urabayashi | H04L 5/0098 |
| 2019/0029003 | A1 * | 1/2019 | Takeda | H04W 72/04 |
| 2019/0037606 | A1 * | 1/2019 | Takeda | H04W 88/06 |
| 2019/0044782 | A1 * | 2/2019 | Zeng | H04L 5/0044 |
| 2019/0045506 | A1 * | 2/2019 | Takeda | H04L 5/0094 |
| 2019/0052503 | A1 | 2/2019 | Hayashi et al. | |
| 2019/0053241 | A1 | 2/2019 | Zhang et al. | |
| 2019/0059075 | A1 * | 2/2019 | Hayashi | H04L 5/0092 |
| 2019/0208481 | A1 | 7/2019 | Tang | |
| 2019/0230696 | A1 | 7/2019 | Kim et al. | |
| 2020/0099499 | A1 * | 3/2020 | Yeo | H04W 68/02 |
| 2020/0177356 | A1 | 6/2020 | Kim et al. | |
| 2020/0214049 | A1 | 7/2020 | Narayanan et al. | |
| 2021/0368487 | A1 * | 11/2021 | Nam | H04L 5/0091 |

FOREIGN PATENT DOCUMENTS

| | | | |
|---|---|---|---|
| EP | 3490316 | A1 | 5/2019 |
| WO | WO 2009062115 | A2 | 5/2009 |
| WO | WO 2010/050731 | A2 | 5/2010 |
| WO | WO 2011/132926 | A2 | 10/2011 |
| WO | WO 2011/132926 | A3 | 1/2012 |
| WO | WO 2015000917 | A3 | 3/2015 |
| WO | WO 2015172098 | A1 | 11/2015 |
| WO | WO 2016047513 | A1 | 3/2016 |
| WO | WO 2016/130175 | A1 | 8/2016 |
| WO | WO 2017035305 | A1 | 3/2017 |
| WO | WO 2017135020 | A1 | 8/2017 |
| WO | WO 2017135312 | A1 | 8/2017 |
| WO | WO 2017156224 | A1 | 9/2017 |
| WO | WO 2017196042 | A1 | 11/2017 |
| WO | WO 2018018417 | A1 | 2/2018 |
| WO | WO 2018031664 | A1 | 2/2018 |
| WO | WO 2018056339 | A1 | 3/2018 |

OTHER PUBLICATIONS

3rd Generation Partnership Project (3GPP), R1-160131, “NB-IoT Uplink Shared Channel Design”, Intel Corporation, 3GPP TSG RAN WG1 NB-IoT Ad-Hoc Meeting, Budapest, Hungary, Jan. 18-20, 2016, 9 pages.

3rd Generation Partnership Project (3GPP), R1-160458, “Random Access Procedure for NB-IoT”, Nokia Networks, Alcatel-Lucent, Alcatel-Lucent Shanghai Bell, 3GPP TSG-RAN WG1 Meeting #84, St. Julian’s, Malta, Feb. 15-19, 2016, 3 pages.

3rd Generation Partnership Project (3GPP), R1-161009, “Random Access Procedure for NB-IoT”, Lenovo, 3GPP TSG RAN WG1 Meeting #84, St Julian’s, Malta, Feb. 15-19, 2016, 4 pages.

3rd Generation Partnership Project (3GPP), R1-1610352, “Random Access and Support for Multiple Numerologies for NR”, InterDigital Communications, 3GPP TSG-RAN WG1 #86bis, Lisbon, Portugal, Oct. 10-14, 2016, pp. 1-3.

3rd Generation Partnership Project (3GPP), R1-166586, “Considerations on Initial Access Design”, Xinwei, 3GPP TSG RAN WG1 Meeting #86, Gothenburg, Sweden, Aug. 22-26, 2016, 6 pages.

3rd Generation Partnership Project (3GPP), RWS-150009, “5G—Key Component of the Networked Society”, Ericsson, 3GPP RAN Workshop on 5G, Phoenix, AZ, USA, Sep. 17-18, 2015, 55 pages.

3rd Generation Partnership Project(3GPP), TS 36.211 V13.0.0, “Technical Specification Group Radio Access Network, Evolved Universal Terrestrial Radio Access (E-UTRA), Physical Channels and Modulation (Release 13)”, Dec. 2015, 141 pages.

3rd Generation Partnership Project(3GPP), TS 36.213 V13.0.1, “Technical Specification Group Radio Access Network, Evolved Universal Terrestrial Radio Access (E-UTRA), Physical Layer Procedures (Release 13)”, Jan. 2016, 326 pages.

3rd Generation Partnership Project(3GPP), TS 36.321 V13.0.0, “Technical Specification Group Radio Access Network, Evolved Universal Terrestrial Radio Access (E-UTRA), Medium Access Control (MAC) Protocol Specification (Release 13)”, Dec. 2015, 82 pages.

3rd Generation Partnership Project(3GPP), TS 36.331 V10.19.0, “Technical Specification Group Radio Access Network, Evolved Universal Terrestrial Radio Access (E-UTRA), Radio Resource Control (RRC), Protocol Specification (Release 10)”, Dec. 2015, 317 pages.

3rd Generation Partnership Project(3GPP), TS 36.331 V13.0.0, “Technical Specification Group Radio Access Network, Evolved Universal Terrestrial Radio Access (E-UTRA), Radio Resource Control (RRC), Protocol Specification (Release 13)”, Dec. 2015, 507 pages.

Carlton, Alan, “Will 5G Say Farewell to OFDM?”, Computer World Article, Mar. 14, 2016, 5 pages.

Rao et al., “Protocol Signaling Procedures in LTE”, Radisys White Paper, Sep. 2011, 11 pages.

Tripathi et al., “LTE E-UTRAN and its Access Side Protocols”, Radisys White Paper, Sep. 2011, 17 pages.

(56) References Cited

OTHER PUBLICATIONS

Lenovo, "Random Access Procedure for N-IoT", 3GPP Tdoc R1-161009, 3GPP TSG RAN WG1 Meeting #8, St Julian's, Malta, Feb. 15-19, 2016, 4 pagess.
Convida Wireless, "Discussion on Sync Signals Supporting Different Numerologies", 3GPP Tdoc R1-167847, 3GPP TSG-RAN WG1 Meeting #86, Gothenburg, Sweden, Aug. 22-26, 2016, 5 pages.
Huawei et al, "Discussion on frame structure for NR", 3GPP Tdoc R1-164032, 3GPP TSG RAN WG1 Meeting #85, Nanjing, China, May 23-27, 2016, 8 pages.
Intel Corporation, "Overview of new radio access technology requirements and designs", 3GPP Tdoc R1-162379, 3GPP TSG RAN WG1 Meeting #84bis, Busan, Korea, Apr. 11-15, 2016, 4 pages.
ZTE et al, "Forward compatibility for numerology and frame structure design", 3GPP Tdoc R1-164261, 3GPP TSG-RAN WG1 Meeting #85, Nanjing, China, May 23-27, 2016, 7 pages.
Panasonic, "Use of multiple numerologies in NR", 3GPP Tdoc R1-167439, 3GPP TSG RAN WG1 Meeting #86, Gothenburg, Sweden, Aug. 22-26, 2016, 9 pages.
Intel Coporation, "Design on NR DL Synchronization", 3GPP Tdoc R1-167705, 3GPP TSG-RAN WG1 Meeting #86, Gothenburg, Sweden, Aug. 22-26, 2016, 8 pages.
Mediatek et al., "Way Forward on bandwidth part in NR," 3GPP TSG-RAN WG1 #88bis, R1-1706745, Spokane, USA (Apr. 3-7, 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.3.0 (Jun. 2017).
Third Generation Partnership Project, "Technical Specification Group Radio Access Network; Evolved Universal Terrestrial Radio Access (E-UTRA); User Equipment (UE) radio transmission and reception (Release 14)," 3GPP TS 36.101 V14.0.0 (Jun. 2016).
Xinwei et al., "WF on DL PRB Bundling Size Value Set ," 3GPP TSG RAN WG1 RAN1 #89, R1-1709791, Hangzhou, P.R. China (May 15-19, 2017).
3rd Generation Partnership Project; Technical Specification Group Radio Access Network; Evolved Universal Terrestrial Radio Access (E-UTRA); Physical layer procedures (Release 13), 3GPP TS 36.213 V13.2.0, Jun. 2016, 381 pages.
Interdigital Communications, "DL control channel framework for NR," 3GPP TSG-RAN WG1 #86bis, R1-1610089, Lisbon, Portugal, (Oct. 10-14, 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.6.0 (Jun. 2017).
Interdigital Communications, "UE Support for Multiple Numerologies with NR," 3GPP TSG-RAN WG1 #86, R1-165055, Göteborg, Sweden (Aug. 22-26, 2016).
Third Generation Partnership Project, "Technical Specification Group Radio Access Network; NR; Medium Access Control (MAC) protocol specification (Release 15)," 3GPP TS 38.321 V0.2.0 (Aug. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0 (Jun. 2017).
Intel et al., "Way forward on PRB indexing," 3GPP TSG-RAN WG1 Ad-Hoc #2, R1-1711855, Qingdao, P.R. China (Jun. 27-30, 2017).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Interdigital, Inc., "On frequency-domain resource allocation for NR," 3GPP TSG RAN WG1 NR Ad-Hoc#2, R1-1710953, Qingdao, P.R. China (Jun. 27-30, 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.3.0 (Jun. 2017).
Huawei et al., "WF on resource allocation for data transmission," 3GPP TSG RAN WG1 Meeting #88, R1-1703781, Athens, Greece (Feb. 13-17, 2017).
NTT Docomo, R1-161022, "Random access procedure for NB-PDSCH", 3GPP TSG RAN WG1 #84, 3GPP (Feb. 5, 2016).
Ericsson et al., "Way Forward on bandwidth part for efficient wideband operation in NR," 3GPP TSG-RAN WG1 #89, R1-17xxxxx (R1-1709802), Hangzhou, P.R. China (May 15-19, 2017).
Huawei et al., "WF on bandwidth part," 3GPP TSG RAN WG1 Meeting #88bis, R1-1706582, Spokane, USA (Apr. 3-7, 2017).
Huawei et al: "Discussion on UE behavior on mixed numerology carrier",3GPP Draft; R1-1609425, 3rd Generation Partnership Project (3GPP), Mobile Competence Centre ; 650, Route Des Lucioles; F-06921 Sophia-Antipolis Cedex ; Francevol. RAN WGI , No. Lisbon, Portugal; Oct. 10, 2016-Oct. 14, 2016 Oct. 1, 2016 (Oct. 1, 2016 XP051159502, Retrieved from the Internet:URL:http://www.3gpp.org/ftp/tsg_ran/WGI RLI/TSGRI 86b/Docs/ [retrieved on Oct. 1, 2016].
Third Generation Partnership Project, "Technical Specification Group Radio Access Network; Study on Scenarios and Requirements for Next Generation Access Technologies; (Release 14)," 3GPP TR 38.913 V14.2.0 (Mar. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.6.1 (Jul. 2017).
Interdigital Communications, "UE Support for Multiple Numerologies for NR," 3GPP TSG-RAN WG1 #86bis, R1-1610022, Lisbon, Portugal, (Oct. 10-14, 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).
3GPP TS 36.211 V13.2.0, 3rd Generation Partnership Project; Technical Specification Group Radio Access Network; EvolvedUniversal Terrestrial Radio Access (E-UTRA); Physical channels and modulation, 2016, 3GPP (Year: 2016).
Third Generation Partnership Project, "Technical Specification Group Radio Access Network; Evolved Universal Terrestrial Radio Access (E-UTRA); User Equipment (UE) radio transmission and reception (Release 14)," 3GPP TS 36.101 V14.4.0 (Jun. 2017).
Ericsson et al., "Activation/deactivation of bandwidth part," 3GPP TSG RAN1 NR Ad-Hoc#2, R1-1711853, Qingdao, P.R. China (Jun. 27-30, 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.8.0 (Jun. 2017).
3rd Generation Partnership Project; Technical Specification Group Radio Access Network; Study on Scenarios and Requirements for Next Generation Access Technologies; (Release 14), 3GPP TR 38.913 V0.3.0, Mar. 2016, 30 pages.
Third Generation Partnership Project, "Technical Specification Group Radio Access Network; Evolved Universal Terrestrial Radio Access (E-UTRA); Physical layer procedures (Release 14)," 3GPP TS 36.213 V14.3.0 (Jun. 2017).
Third Generation Partnership Project, "Technical Specification Group Radio Access Network; Evolved Universal Terrestrial Radio Access (E-UTRA); Physical layer; Measurements (Release 13)," 3GPP TS 36.214 V13.4.0 (Dec. 2016).
Interdigital Communications, "A Framework for Initial Access for NR," 3GPP TSG-RAN WG1 #86bis, R1-1610351, Lisbon, Portugal, (Oct. 10-14, 2016).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 13)," 3GPP TS 36.213 V13.6.0 (Jun. 2017).
Mediatek et al., "Way Forward on Further Details for Bandwidth Part," 3GPP TSG-RAN WG1 NR Ad-Hoc Meeting, R1-1711802, Qingdao, P.R. China (Jun. 27-30, 2017).
Third Generation Partnership Project, "Technical Specification Group Radio Access Network; NR; Physical channels and modulation (Release 15)," 3GPP TS 38.211 V0.1.0 (Jun. 2017).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
Third Generation Partnership Project, "Technical Specification Group Radio Access Network; NR; Radio Resource Control (RRC); Protocol specification (Release 15)," 3GPP TS 38.331 V0.0.4 (Jun. 2017).
Intel et al., "Way forward on further details of bandwidth part operation," 3GPP TSG-RAN WG1 Ad-Hoc #2, R1-1711788, Qingdao, P.R. China (Jun. 27-30, 2017).
Interdigital Communications, "UE Support for Multiple Numerologies with NR," 3GPP TSG-RAN WG1 #86, R1-167328, Göteborg, Sweden (Aug. 22-26, 2016).
Mediatek et al., "Way Forward on Bandwidth Part Operation," 3GPP TSG-RAN WG1 Meeting #90, R1-1715307, Prague, Czech Republic (Aug. 21-25, 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.3.0 (Jun. 2017).
Third Generation Partnership Project, "Technical Specification Group Radio Access Network; Evolved Universal Terrestrial Radio Access (E-UTRA); Physical channels and modulation (Release 13)," 3GPP TS 36.211 V13.6.0 (Jun. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).
Interdigital, "DL data scheduling," 3GPP TSG RAN WG1 Meeting #89, R1-1709010, Hangzhou, P.R. China (May 15-19, 2017).
Third Generation Partnership Project, "Technical Specification Group Radio Access Network; Evolved Universal Terrestrial Radio Access (E-UTRA); Physical layer; Measurements (Release 14)," 3GPP TS 36.214 V14.2.0 (Mar. 2017).
Mitsubishi Electric, "Performance comparison of nonlinear precoding schemes for NR MU-MIMO," 3GPP TSG-RAN WG1 #86bis, R1-1610229, Lisbon, Portugal (Oct. 10-14, 2016).
Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).
LG Electronics et al., "WF on configuration of a BWP in wider bandwidth operation," 3GPP TSG RAN1 NR Ad-Hoc#2, R1-1711812, Qingdao, P.R. China (Jun. 27-30, 2017).
Oppo et al., "WF on bandwidth part configuration," 3GPP TSG RAN WG1 Meeting #89, R1-1709519, Hangzhou, P.R. China (May 15-19, 2017).
Interdigital Communications, "Forward compatible control channel framework for NR," 3GPP TSG-RAN WG1 #86, R1-167327, Göteborg, Sweden (Aug. 22-26, 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.3.0 (Jun. 2017).
Huawei et al., "On numerology determination during initial access", 3GPP Tdoc R1-1611651, 3GPP TSG RAN WG1 Meeting #87, Reno, USA, Nov. 14-18, 2016, 3 pages.
U.S. Appl. No. 62/400,950, "Methods for Flexible Resource Usage", filed Sep. 28, 2016.
Third Generation Partnership Project, "Technical Specification Group Radio Access Network; Evolved Universal Terrestrial Radio Access (E-UTRA); Multiplexing and channel coding (Release 13)," 3GPP TS 36.212 V13.6.0 (Jun. 2017).
Samsung, "Overview on issues for NR initial access", 3GPP Tdoc R1-166796, 3GPP TSG RAN WG1 Meeting #86, Gothenburg, Sweden, Aug. 22-26, 2016, 4 pages.
Oppo et al., "Outputs of offline discussion on RBG size/number determination," 3GPP TSG RAN WG1 NR Ad-Hoc#2, R1-1711843, Qingdao, P.R. China (Jun. 27-30, 2017).
U.S. Appl. No. 62/373,089, "Methods for Flexible Resource Usage", filed Aug. 10, 2016.
Third Generation Partnership Project, "Technical Specification Group Radio Access Network; NR; NR and NG-RAN Overall Description; Stage 2 (Release 15)," 3GPP TS 38.300 V0.4.1 (Jun. 2017).
Interdigital Communications, "Control Plane Functions and transport mechanism for Interworking between NR and LTE," 3GPP TSG-RAN WG2 #95bis, R2-166856, Kaohsiung, Taiwan (Oct. 10-14, 2016).
Intel Corporation, "Frame structure considerations for URLLC" [online], 3GPP Tdoc R1-167127, 3GPP TSG-RAN WG1#86 , Aug. 13, 2016 <URL:http://www.3gpp.org/ftp/tsg_ran/WG1_RL1/TSGR1_1134/Docs/R1-167127.zip>.
Nokia Networks: "Basic system design for UL NB-IoT",3GPP Tdoc R1-160041 , 3GPP TSG-RAN WG1 NB-IoT Adhoc, Budapest, Hungary, Jan. 18-20, 2016, 2 pages.
Samsung Electronics: "pcr 45.820 Narrowband LTE (revision of GP-150690)", 3GPP Tdoc GP-150846, 3GPP TSG Geran #67, Yinchuan, China, Aug. 10-14, 2015, 17 pages.

* cited by examiner

DETERMINATION OF A SIGNAL STRUCTURE IN A WIRELESS SYSTEM

CROSS REFERENCE TO RELATED APPLICATIONS

This application is the National Stage entry under 35 U.S.C. § 371 of Patent Cooperation Treaty Application PCT/US2017/021504, filed Mar. 9, 2017, which claims the benefit of U.S. Provisional Patent Application Nos. 62/306,445, filed on Mar. 10, 2016, 62/372,984 filed on Aug. 10, 2016, and 62/400,739 filed on Sep. 28, 2016, the contents of which are hereby incorporated by reference herein.

BACKGROUND

Mobile communications continue to evolve. A fifth generation may be referred to as 5G. A 5G air interface may support improved various use cases—improved broadband performance (IBB), industrial control and communications (ICC), vehicular applications (V2X) and/or massive machine-type communications (mMTC). The use cases may use a range of parameters (e.g., latency, reliability, data rate, etc.) and/or a range of frequency bands. Various signal structures or numerologies may be provided to support such range of use cases and/or frequency bands.

SUMMARY

Systems, methods, and instrumentalities are disclosed for aspects of determining signal structure in a wireless system. Signal structures may include one or more transmission schemes and associated parameters. Signal structures may be adapted or used (e.g. flexibly) to support a variety of use cases in a communication system, such as a 5G system. A 5G system may be a 5G flexible radio access technology (RAT), which may be referred to as 5gFLEX.

A wireless transmit/receive unit (WTRU), e.g., a 5G WTRU, may identify, determine and/or select one or more numerologies associated with a transmission. A WTRU may determine which numerology of a plurality of configured numerologies may be used for at least one transmission. The numerologies may include one or more of a subcarrier spacing, a transmission duration, a symbol duration, a number of symbols, or a cyclic prefix (CP) size. In an example, one or more of the numerologies may be selected based on one or more service requirements. In an example, one or more numerologies may be associated with a service type. In an example, one or more numerologies may be selected based on one or more channel properties or channel measurements. In an example, one or more numerologies may be autonomously selected by the WTRU. In an example, a WTRU may indicate a change in the one or more channel properties.

A WTRU may send an access request to a node indicating the identified, determined, or selected one or more numerologies. The access request may be a random access channel (RACH) request or a scheduling request (SR). The WTRU may monitor one or more search spaces for one or more physical control channels. The search spaces may be monitored based on an identified, determined, or selected one or more numerologies. Within one of the search spaces, the WTRU may receive and successfully decode a physical control channel. The WTRU may transmit data based on the numerology associated with the search space in which the physical channel was successfully decoded.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
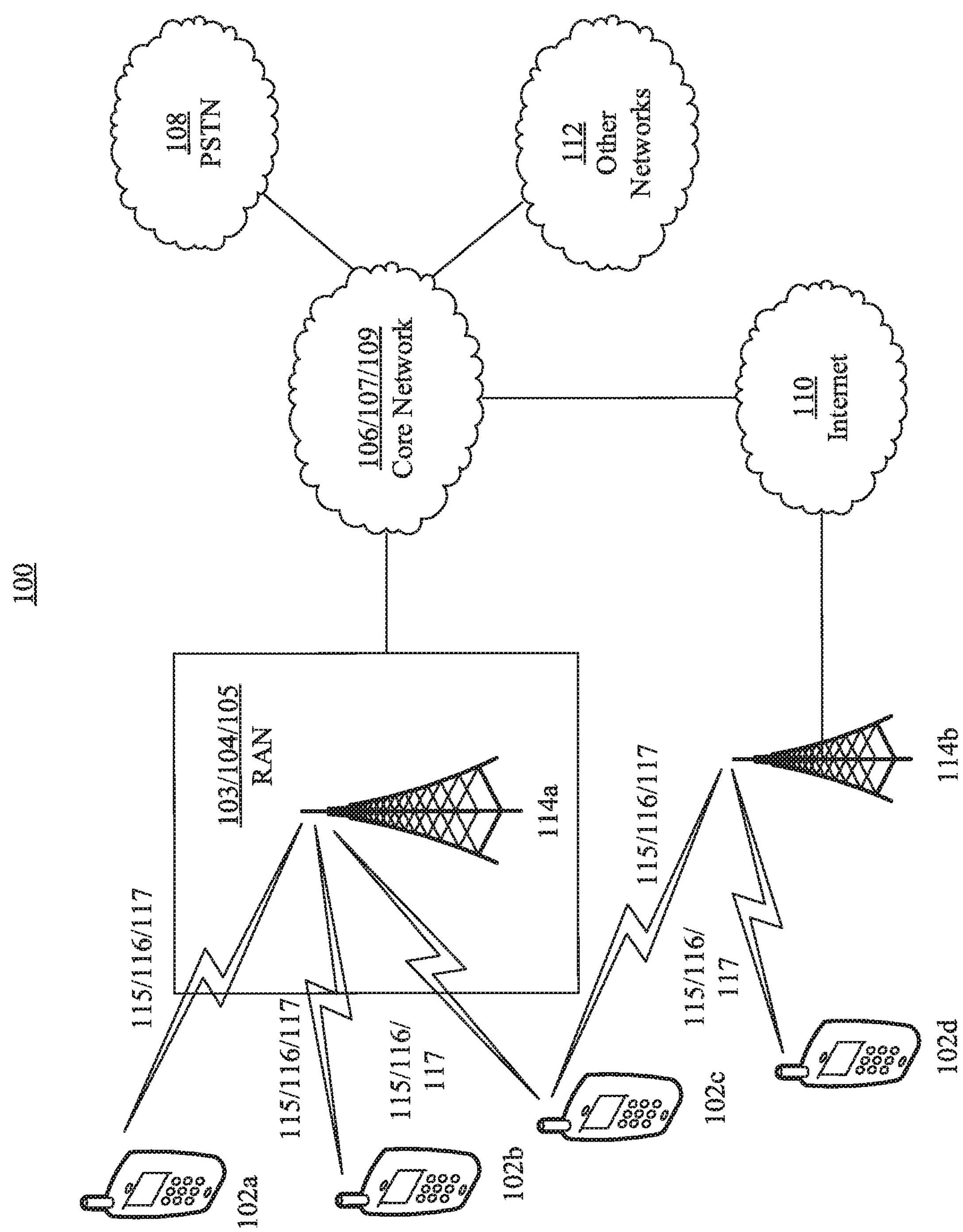
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102*a*, 102*b*, 102*c*, and/or 102*d* (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106/107/109, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in some embodiments, the base station 114*a* may include three transceivers, e.g., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
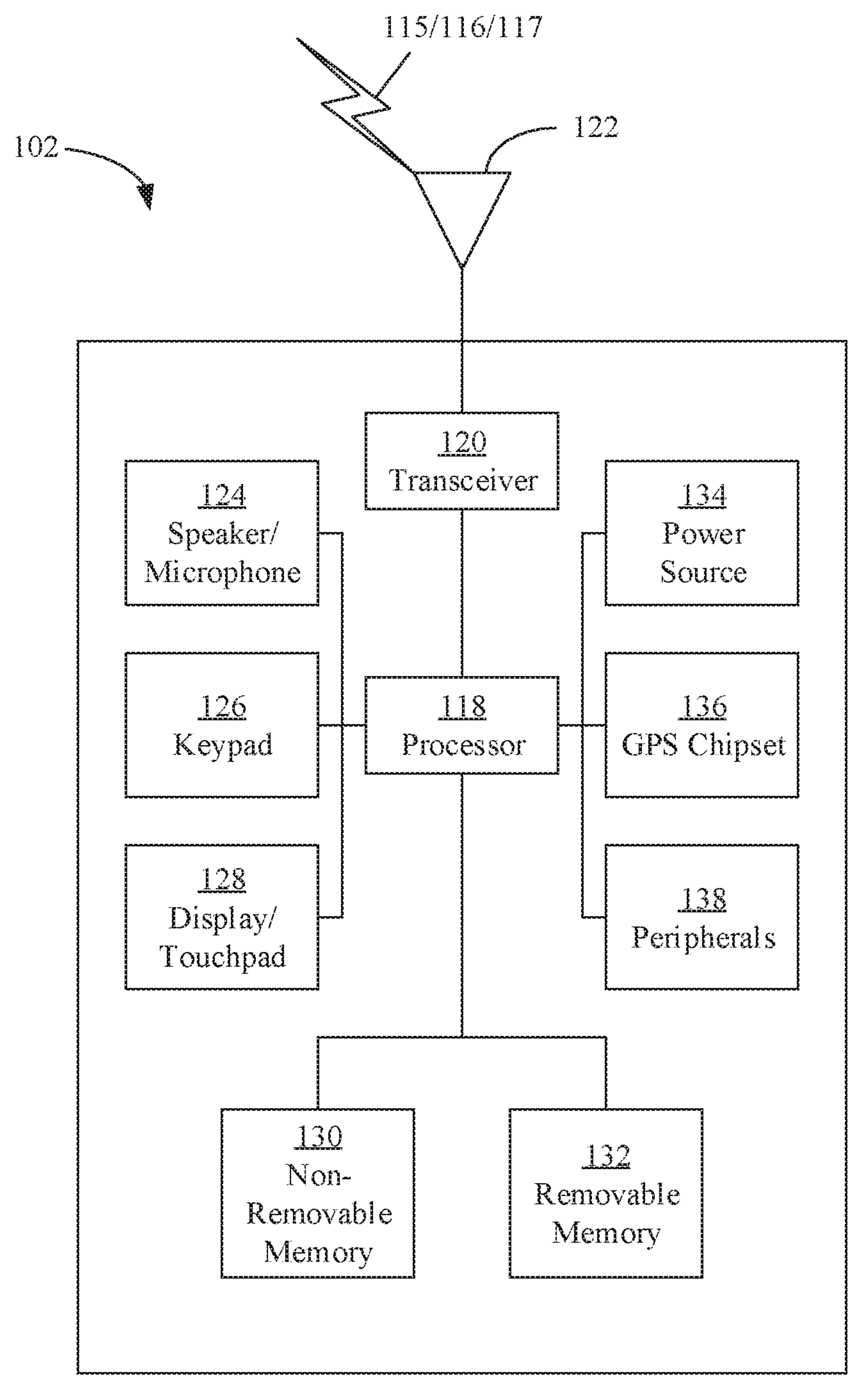
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
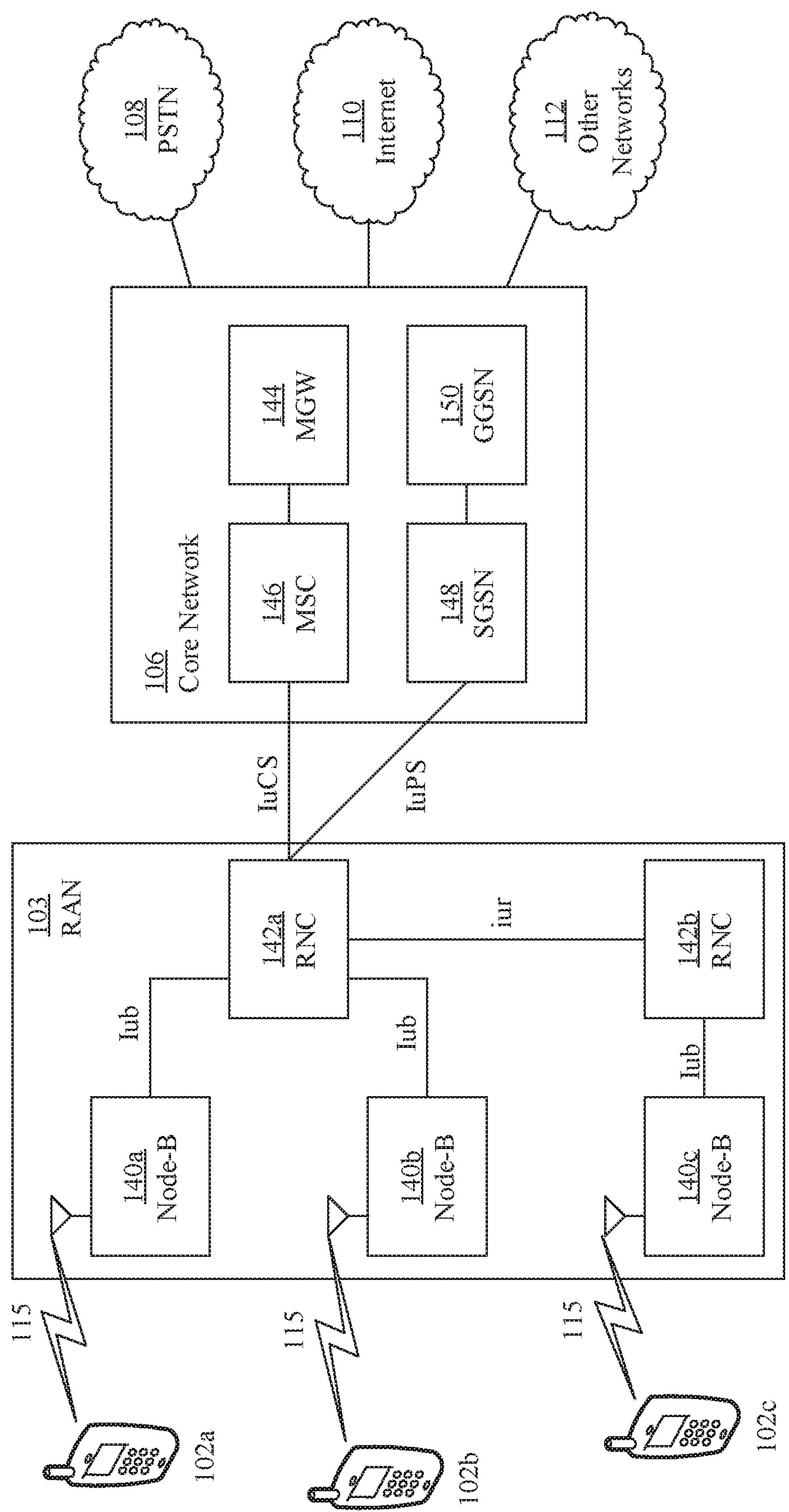
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102*a*, 102*b*, 102*c* over the air interface 115. The RAN 103 may also be in communication with the core network 106. As shown in FIG. 1C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*,

140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
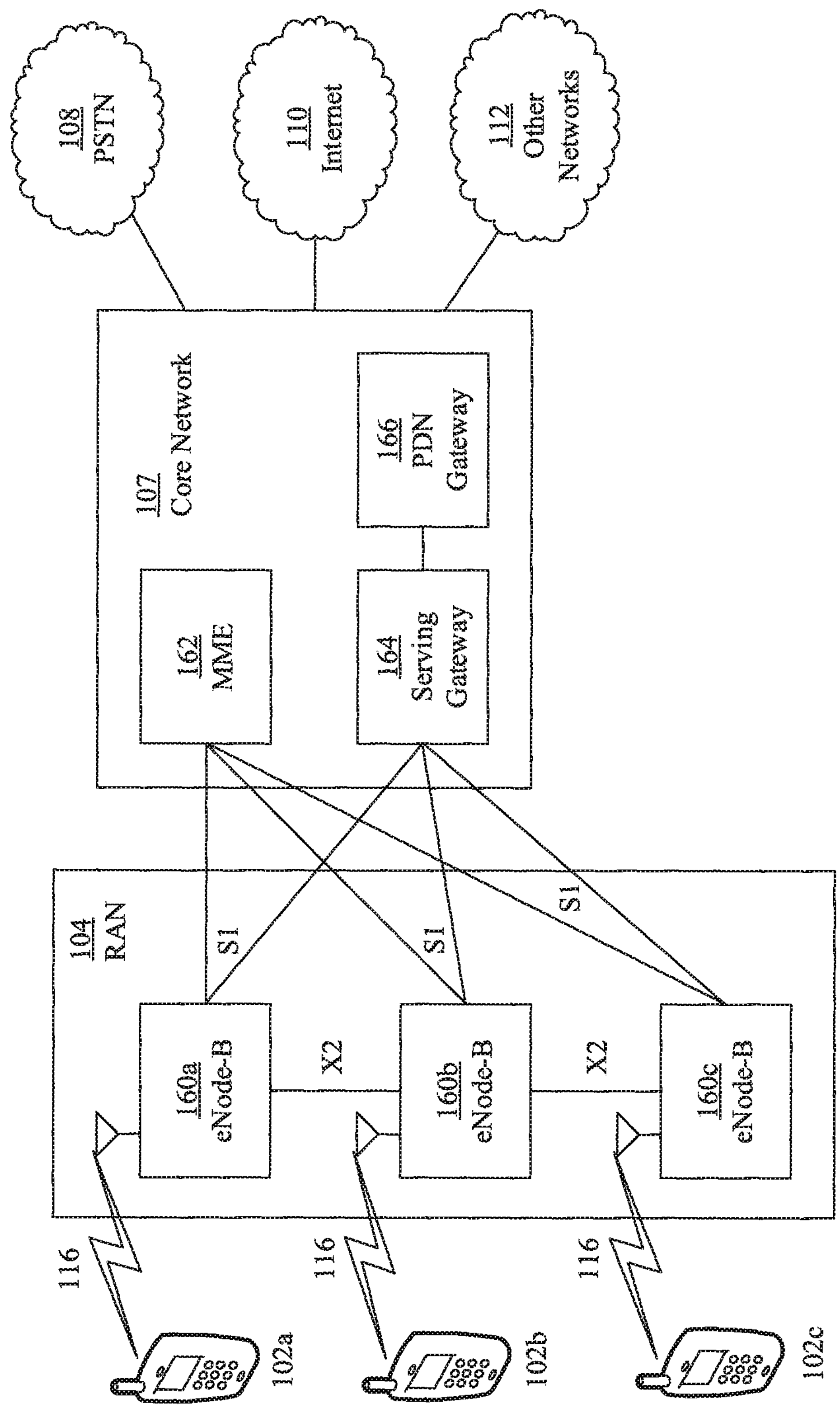
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In some embodiments, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink (UL) and/or downlink (DL), and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
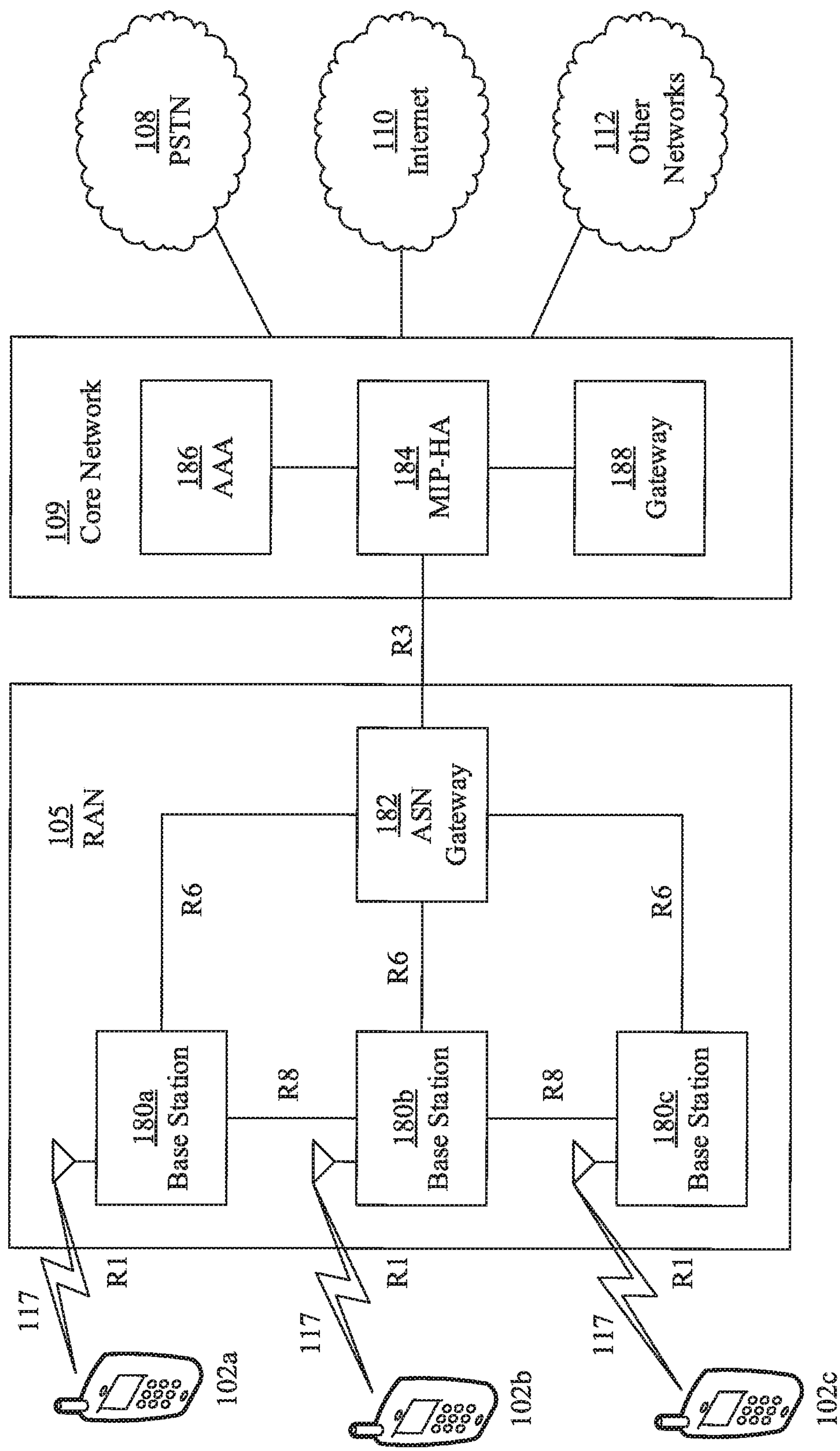
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In some embodiments, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

A fifth generation wireless communication system may be referred to as 5G. A 5G air interface may be designed to enable various use cases including, for example, improved broadband performance (IBB), industrial control and communications (ICC), vehicular applications (V2X), and/or massive machine-type communications (mMTC). A 5G air interface may support one or more use cases, for example, by supporting ultra-low transmission latency (LLC), ultra-reliable transmission (URC) and/or MTC operation. The MTC operation may include narrowband operation. Support for ultra-low transmission latency (LLC) may comprise, for example, support for an air interface latency time, such as 1 ms round trip time (RTT), a transmission time interval (TTI), such 100 us to 250 us, and/or an ultra-low access latency (e.g., time from initial system access until completion of a transmission of a first user plane data unit), such as an end-to-end (e2e) latency time (e.g. less than 10 ms). Support for ultra-reliable transmission (URC) may include, for example, a transmission success and service availability (e.g., 99.999% or a Packet Loss Ratio less than 10e-6) and/or a speed mobility range (e.g., 0-500 km/h). Support for MTC operation may comprise, for example, air interface support for narrowband operation (e.g., less than 200 KHz), extended battery life (e.g., 15 years of autonomy) and/or minimal communication overhead for small and infrequent data transmissions (e.g., low data rate such as 1-100 kbps with access latency of seconds to hours).

Support may be provided for one or more spectrum operating modes (SOMs). A WTRU may be configured to perform transmissions that may use one or more of the following: a numerology, a TTI duration, an initial power level, a hybrid automatic repeat request (HARQ) processing type, an upper bound for successful HARQ reception/transmission, a transmission mode, a physical channel (uplink or downlink), a waveform type, a transmission according to a RAT (e.g., LTE or 5G transmission), etc. A numerology may comprise, for example, a spacing value, a symbol duration, a number of symbols, waveform characteristics, etc. SOM may correspond to a QoS level and/or related aspect, e.g. maximum/target latency or maximum/target block error rate (BLER). The numerology may be used to define the physical resources used for a transmission. A SOM may correspond to a spectrum area, a control channel or aspect thereof (e.g., a search space, a downlink control information (DCI) type). For example, a WTRU may be configured with a SOM for a URC type of service, an LLC type of service and/or a massive broadband (MBB) type of service. A WTRU may have a configuration for a SOM for system access and/or transmission/reception of L3 control signaling (e.g., radio resource control (RRC) signaling), such as in a portion of a spectrum (e.g., nominal system bandwidth) associated with a system.

Support may be provided for a multi-carrier signal. A communication system (e.g., LTE) may employ multi-carrier signals, such as an orthogonal frequency division multiplex (OFDM) signal or a single-carrier frequency-division-multiple-access (SC-FDMA) signal. A multi-carrier signal may provide benefits, such as high spectrum efficiency, efficient multiplexing of users on a carrier and implementation. Multi-carrier signals may be characterized by a limited number of parameters, e.g., sub-carrier spacing, symbol duration and/or cyclic prefix or time guard duration.

There may be a finite and/or a small number of combinations of parameters. In an example, downlink subcarrier spacing may be set to 15 kHz, a value of 7.5 kHz may be specified for multimedia broadcast multicast service (MBMS), and a type of signal may be OFDM. In an example, uplink subcarrier spacing may be set to 15 kHz for signals and channels. A physical random access channel (PRACH), may use a smaller value than the uplink subcarrier spacing (e.g., 7.5 kHz and/or 1.25 kHz). A type of uplink signal may be single-carrier frequency division multiplex (SC-FDM). A main subcarrier spacing value of 15 kHz may be suitable, for example, considering propagation characteristics in deployments targeted by LTE. A main subcarrier spacing value of 15 kHz may be high in comparison to Doppler spread values expected given the maximum speed and frequency bands used by the WTRU. A reciprocal of main subcarrier spacing value of 15 kHz may be sufficiently high compared to the duration of the cyclic prefix used to avoid inter-symbol interference due to delay spread. Various durations may be defined for a cyclic prefix, for example, a normal cyclic prefix and an extended cyclic prefix. Normal cyclic prefix may be used of approximately 5 microseconds. An extended cyclic prefix of approximately 17 microseconds may be used in scenarios where the expected delay spread is larger.

Support may be provided for bandwidth flexibility. A 5G air interface characteristic may provide different transmission bandwidths on uplink and/or downlink. Bandwidths may range from a nominal system bandwidth to a maximum value. The maximum system bandwidth may correspond to a system bandwidth. Supported system bandwidths (e.g., for single carrier operation) may, for example, comprise 5, 10, 20, 40 and 80 MHz. Supported system bandwidths may comprise bandwidth in a given range, e.g., a range from a few MHzs to 160 MHz. Nominal bandwidths may have one or more fixed values. Narrowband transmissions (e.g. up to 200 KHz) may be supported within an operating bandwidth for MTC devices.

Figure 2:
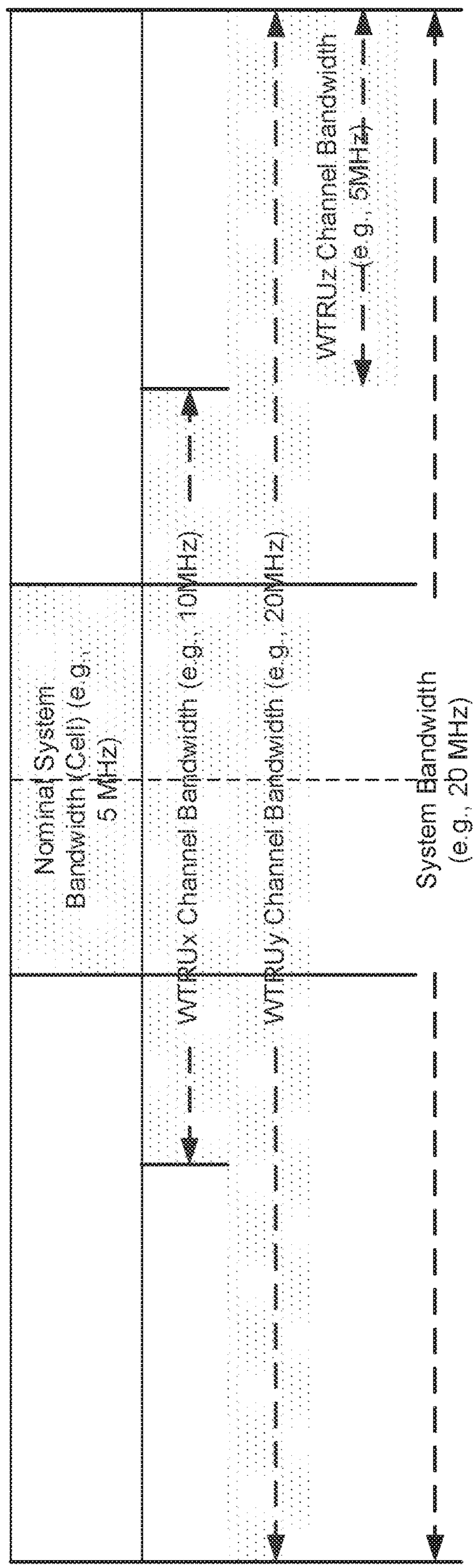
FIG. 2 is an example of system bandwidth, e.g., a system transmission bandwidth.

FIG. 2 illustrates an example of system bandwidth, for example, system transmission bandwidth. System bandwidth may be referred as the largest portion of spectrum that can be managed by a network for a given carrier. A nominal system bandwidth may correspond to a portion, a WTRU may minimally support for cell acquisition, measurements, and/or initial access to the network. A WTRU may be configured with a channel bandwidth within the range of system bandwidth. For example, as illustrated in FIG. 2, WTRUx may be configured with 10 MHz bandwidth, WTRUy with 20 MHz, and the WTRUz as 5 MHz of the 20 MHz system bandwidth. A WTRU's configured channel bandwidth may or may not include the nominal part of system bandwidth, for example, as illustrated in FIG. 2.

Bandwidth flexibility may be achieved, for example, when applicable sets of radio frequency (RF) requirements for a given maximum bandwidth in an operating band can be met without the introduction of additional allowed channel bandwidths for that operating band, e.g., due to efficient support of baseband filtering of the frequency domain waveform.

Spectrum for narrowband transmissions within the nominal system bandwidth, system bandwidth or configured channel bandwidth may be allocated, for example, by configuring, reconfiguring and/or dynamically changing a WTRU's channel bandwidth for single carrier operation.

A physical layer of an air interface (e.g., a 5G air interface) may be band-agnostic and/or may support operation in licensed bands below 5 GHz and/or in unlicensed bands in the range 5-6 GHz, for example. Listen-Before-Talk (LBT) Cat 4 based channel access framework, e.g., similar to LTE license assisted Access (LAA), may be supported, for example, for operation in unlicensed bands.

Cell-specific and/or WTRU-specific channel bandwidths for arbitrary spectrum block sizes may be scaled and managed, for example, using scheduling, addressing of resources, broadcasted signals, measurements, etc.

Support may be provided for a system signature. A WTRU may be configured to receive and/or detect one or more system signatures. A system signature may comprise a signal structure using a sequence. A signal may be, for example, similar to a synchronization signal (e.g., LTE Primary Synchronization Signal (PSS) and/or a Secondary Synchronization Signal (SSS)). A signature may, for example, be specific to a particular node or Transmission/Reception Point (TRP) within a given area. A signature may be common to a plurality of such nodes or TRPs within an area. A specific or common signature may not be known and/or relevant to a WTRU. A WTRU may determine and/or detect a system signature sequence and may determine one or more parameters associated with a system. For example, a WTRU may derive an index and may use the index to retrieve associated parameters within a table (e.g., an access table). In an example, a WTRU may use received power associated with a signature for open-loop power control to set initial transmission power, such as when a WTRU determines that it may access (and/or transmit) using applicable system resources. In an example, a WTRU may use the timing of a received signature sequence, e.g., to set the timing of a transmission (e.g. a preamble on a PRACH resource), such as when a WTRU determines that it may access (and/or transmit) using applicable system resources.

Support may be provided for access tables. A WTRU may be configured with a list of one or more entries. A list may be referred to as an access table. A list may be indexed. For example, a list may associate each entry with a system signature and/or a sequence thereof. An access table may provide initial access parameters for one or more areas. An entry may provide one or more parameters to be used to perform an initial access to a system. Parameters may include at least one of a set of one or more random access parameters, such as, applicable physical layer resources (e.g., PRACH resources) in time and/or frequency, initial power level and/or physical layer resources for reception of a response. Parameters may include access restrictions, e.g., public land mobile network (PLMN) identity and/or closed subscriber group (CSG) information. Parameters may include routing-related information, for example, applicable routing area(s). An entry may be associated with (and/or indexed by) a system signature. An entry may be common to a plurality of nodes or TRPs. A WTRU may receive an access table, for example, by a transmission using dedicated resources. The access table may be received via radio resource control (RRC) configuration, and/or using broadcast resources. Periodicity of a transmission of an access table may be long (e.g., up to 10240 ms). Periodicity may be longer than the periodicity of the transmission of a signature (e.g., approximately 100 ms).

A 5G air interface (e.g., a 3GPP new radio interface and/or other evolutions of LTE) that may support a variety of use cases and frequency bands may have different requirements and/or may support a wide range of frequency bands. A variety of possible signal structures, such as the signal type and/or parameter values applicable to the signal type, may be used in a flexible manner to support a variety of usage cases and frequency bands. For example, support for ultra-reliable, low-latency communication (URLLC) may be provided by shorter symbol durations (and, for example, larger subcarrier spacing). Support for massive machine-type communication may be provided by longer symbol duration and/or use of single-carrier signals. High frequency bands, such as millimeter-wave bands, which may entail larger Doppler spread values, may be deployed. Such deployments may be supported by larger sub-carrier spacing compared to LTE. Narrow beams with a large number of antenna elements may be used. Use of such deployment may result in smaller delay spread values. The smaller delay spread values may allow for optimization of the cyclic prefix overhead.

Flexible use of signal structures may be supported by determining signal structure that may be used in transmission or reception, and adapting the signal structures to the usage, deployment scenario and/or channel characteristics. Adaptation may occur dynamically and/or on a WTRU-specific basis.

For example, a signal structure may refer to one or more of the following: a transmission scheme, a parameter value associated with a transmission scheme, a characteristic associated with a receiver or transmitter, a frame structure, a control channel, a characteristic associated with HARQ processing, or other physical processing aspects associated with the use of a signal structure. The signal structure may refer to type of signal utilized for a transmission, for example including one or more of the numerology used to define resources of the signal structure and/or other definitions of resources used for wireless transmission. The terms signal structure and numerology may be used interchangeably herein.

A transmission scheme may indicate a scheme that may be used for a transmission. For example, a single-carrier scheme, a multi-carrier scheme, or a multi-carrier design, such as OFDM, SC-FDMA, generalized frequency division multiplexing (GDFM), filtered band multi-carrier (FBMC), universal filtered multi-carrier (UFMC), zero-tail discrete fourier transform (DFT)-spread OFDM, etc.

A parameter value associated with a transmission scheme or a numerology-related aspect associated with a transmission may comprise, for example, a subcarrier spacing, a symbol duration, a cyclic prefix duration, a zero-tail length, a guard time duration (e.g., for a multi-carrier scheme), a transmission power component such as a nominal or desired power, a compensation/boosting factor and/or an offset (positive or negative), and/or a chip rate (e.g., for a direct sequence spreading transmission scheme).

A characteristic associated with an aspect of a receiver or a transmitter may comprise, for example, whether a signal is received (e.g., via a downlink or a sidelink reception) or transmitted (e.g., using an uplink or a sidelink transmission), the applicable demodulation, reference signals, resource thereof, and/or associated process.

A signal structure may be used to refer to at least one of the following: a frame structure, a control channel, a characteristic associated with a HARQ processing, one or more other physical processing aspects. A frame structure may be associated with the use of a signal structure, which may be defined in terms of a placement in time and/or frequency of one or more reference signal(s), synchronization signal(s), physical channel(s) and/or basic timing parameter(s), such as a frame, subframe, transmission time interval (TTI) duration, the duration of each symbol within the structure, etc. A control channel may be used for scheduling uplink, downlink and/or sidelink transmissions according to a signal structure, which may include at least one search space.

A characteristic associated with HARQ processing may include, for example, a number of HARQ processes (e.g., determined as a function of the associated round-trip time), a relative timing between reception of scheduling instructions, reception/transmission of a transport block and transmission/reception of HARQ feedback, whether block coding may be used, the amount of applicable transmission diversity, etc.

Other physical processing aspects associated with the use of the signal structure may comprise, for example, a spatial processing scheme (MIMO, spatial diversity schemes such as space frequency block coding (SFBC), cyclic delay diversity (CDD), space time block coding (STBC)), antenna or beam properties (e.g., beam width or whether beamforming is performed), precoding scheme, transmission mode, coding scheme, spreading scheme, multiple-access scheme (e.g., resource spread multiple access, sparse code multiple access), bandwidth or maximum bandwidth, etc.

A WTRU configuration may include support for one or more signal structures or numerologies. A numerology may refer to the manner in which resources corresponding to or within a signal stricture are defined. A WTRU may be configured to transmit and/or receive using at least one of a set of one or more possible (or valid) signal structure(s). For example, a signal structure may be a combination of parameters applicable to the above aspects. A set of possible signal structure(s) may be linked to a capability of a WTRU. A set of possible signal structure(s) may be associated with a function and/or SOM of the WTRU's configuration. For example, a WTRU may be configured with a set for performing an initial access to a wireless system, a set for URLLC transmissions and a set for MBB transmissions. A set of possible signal structure(s) may be associated with a system signature in a WTRU's configuration, which may be configured from the reception of an access table.

In an example of a set of possible or valid structures (e.g., for WTRU reception), a WTRU may be configured to receive transmissions using at least one of a set of three possible signal structures. A first signal structure may be characterized as an OFDM transmission with a subcarrier spacing of 15 kHz and a cyclic prefix duration of 5.21 microseconds for a first symbol of a subframe and 4.68 microseconds for a second symbol of a subframe (e.g., a signal structure corresponding to LTE downlink). A second signal structure may be characterized as an OFDM transmission with a subcarrier spacing of 75 kHz and a cyclic prefix duration of 0.9 microseconds. A third signal structure may be characterized as an OFDM transmission with a subcarrier spacing of 300 kHz and a cyclic prefix duration of 0.1 microseconds.

In an example of a set of possible or valid structures (e.g., for WTRU transmission), a WTRU may be configured to perform transmissions using at least one of a set of four possible signal structures. A first signal structure may be characterized as a single-carrier transmission with direct sequence spreading and chip rate of 1.28 Mcps. A second signal structure may be characterized as an SC-FDMA scheme with subcarrier spacing of 15 kHz and a cyclic prefix duration of 5.21 microseconds for a first symbol of a subframe and 4.68 microseconds for a second symbol of a subframe (e.g., a signal structure corresponding to LTE uplink). A third signal structure may be characterized as an SC-FDMA transmission with a subcarrier spacing of 75 kHz and a cyclic prefix duration of 0.9 microseconds. A third signal structure may be characterized as an SC-FDMA transmission with a subcarrier spacing of 300 kHz and a cyclic prefix duration of 0.1 microseconds.

A WTRU may be configured with or configured to obtain one or more sets of one or more valid signal structures, for example, based on a pre-configuration, a dedicated configuration, a broadcast configuration and/or a broadcast signal sequence and/or relative timing/frequency offset between signals.

A signal structure may be pre-defined by a pre-configuration. A signal structure may be configured and or indicated using at least one of the following: a control protocol (e.g., radio resource control (RRC) protocol) or a higher layer protocol, a medium access protocol such as using a MAC Control Element and/or using a random access response (RAR). The RAR may be received during a random access procedure. The signal structure may be configured and/or indicated using a downlink control signal such as by a DCI received on a control channel. For example, a control channel associated with a SOM. A SOM may be a SOM for which a signal structure is applicable or a different SOM such as one that may be associated with access procedures.

A signal structure may be configured and/or indicated using a broadcast configuration using one or more of the following: a control protocol, a medium access protocol, a master information block (MIB), or a system information broadcast (SIB). A control protocol (e.g., RRC protocol) or higher layer protocol may be used to convey the system information. A medium access protocol such as by a MAC Control Element may convey information on a common data channel received by shared scheduling information and/or by an RAR. The RAR may be received during a random access procedure (e.g., in a common portion of a message). A MIB may be broadcast and/or may support determination of further aspects of the signal structure of a system (e.g., for the access portion of a system). A SIB may support determination of further aspects of a signal structure associated with one or more SOM associated with a system (e.g., for portions other than the access portion of a system).

A signal structure may be configured and/or indicated using a broadcast signal sequence and/or a relative timing/frequency offset between one or more broadcast signals. For example, a signal structure may be indicated and/or determined based on one or more of the following: an index associated with a sequence of a broadcast signal, a timing difference between a plurality of broadcast signals, or a frequency offset between a plurality of broadcast signals. A broadcast signal may be similar to a system signature and/or a primary synchronization signal (PSS)/a secondary synchronization signal (SSS) in LTE.

A configuration may be an access table including one or more entries indexed in association with a system signature, a node identity and/or a cell identity. An entry may include a description or one or more signal structure(s).

One or more of the following may be used to allow a WTRU to make a determination of at least one signal structure for use, among a set of possible structures: identify a signal structure for a signal to be received, select a signal structure for a signal to be transmitted, or indicate a signal structure for a signal to be transmitted. A WTRU may receive a signal from a network entity, for example a transmission point or a node. A WTRU may receive a signal from another WTRU. A WTRU may transmit a signal to a network entity or to another WTRU.

A WTRU may be configured with a set of values, for example, a default set of values. The set of values may characterize a signal structure applicable to at least a portion of available physical layer resources. The signal structure may be referred to as a default signal structure.

For example, a WTRU may be configured to operate according to a default signal structure according to one or more of the following: a function of a procedure, a function of applicable physical layer resources, or a function of the identity of a physical channel (control and/or data) or signal.

In an example of operating according to a default signal structure as a function of a procedure, a WTRU may use a default signal structure when it performs at least one of an initial access procedure, a random access procedure, measurements (e.g., intra- or inter-frequency), camping, paging reception, a recovery procedure (e.g., as a connection re-establishment and/or following the determination of radio link problems or radio link failure, such as for the concerned resources/cell/TRP).

In an example of operating according to a default signal structure as a function of applicable physical layer resources, a WTRU may use a default signal structure for transmissions associated with specific resources in time and/or frequency, such as resources corresponding to a nominal system bandwidth of a cell, radio access and/or a system signature.

In an example of operating according to a default signal structure as a function of the identity of a physical channel (control and/or data) or signal, a physical channel (control and/or data) or signal may comprise a downlink broadcast signal or channel, a physical random access channel (PRACH), a downlink control channel and/or a downlink data channel.

In an example of a downlink broadcast signal or channel, a WTRU may use a default signal structure for the reception of broadcast signals associated with a transmission/reception point (TRP) and/or a cell. A broadcast transmission may correspond to a system signature, a reference signal (e.g., for the purpose of measurements), a downlink control channel (e.g., a PDCCH), a Master Information Block (MIB), System Information Broadcast (SIB or SysInfo), etc.

In an example of a physical random access channel (e.g., a PRACH), a WTRU may use a default signal structure for the transmission of a preamble on a random access channel. In an example of a downlink control channel, a WTRU may use a default signal structure for the reception of a downlink control channel (e.g. a PDCCH), such as a control channel associated with paging and/or other access-related aspects. In an example of a downlink data channel, a WTRU may use a default signal structure for the reception of downlink system information, multicast data channel, broadcast data channel, and/or a paging channel.

For example, a WTRU may determine an applicable system signature for a given frequency/carrier from the reception of access tables. A default signal structure may be associated with a system signature for at least a portion of the concerned frequency/carrier. A WTRU may determine an applicable SOM for a given set (or subset) of physical layer resources for a given frequency/carrier. A WTRU may determine the applicable SOM for a set or a subset of physical layer resources for a frequency or carrier. An applicable SOM may be determined based on a configuration aspect of a WTRU, from the reception of a control channel or from the reception of access tables. A default signal structure may be associated with a SOM for the concerned frequency/carrier.

A WTRU may revert to an applicable default signal structure, for example, when the WTRU determines that it is experiencing radio link problems, radio link failure and/or other impairments.

A signal structure may be determined based on one or more of the following: an operating frequency, a type of spectrum license mode, time and frequency resource of a transmission, or a property and/or a characteristic of a transmission, outcome of a decoding attempt for a transmission (e.g., blind decoding), timing and power of a transmission, context of a transmission, an explicit indication to or from a WTRU, or an implicit indication to or from a WTRU.

A signal structure may be determined based on an operating frequency or a band in which a transmission may take place. The transmission may take place according to a mapping. The mapping may be pre-defined or configured. An operating frequency or a band may comprise, for example, a center frequency of a carrier or a range of frequencies. For example, a signal structure with subcarrier spacing of 75 kHz may be used for a transmission above 6

GHz and/or below 30 GHz while a signal structure with subcarrier spacing of 300 kHz may be used for higher frequencies.

A signal structure may be determined based on the type of license associated with a spectrum used for transmission. A spectrum license type or mode may include unlicensed, lightly licensed, and/or licensed spectrum. For example, the signal structure in unlicensed spectrum may include additional time guard bands or may have a time/frequency structure.

A signal structure may be selected based on a period of time and/or a range of frequencies within a carrier (e.g., a range of subcarriers or resource blocks) in which a transmission takes place. A time interval may be defined with respect to the transmission timing of another signal, for example, a system signature or a reference signal.

A signal structure applicable to a transmission may be determined based on a property of the concerned transmission and/or its type. For example, the property or type may consist of at least one of the following: a channel vs signal and type/purpose of transmission, a direction (e.g., uplink, downlink, sidelink, etc.), a duplex mode (e.g., frequency division duplex (FDD), time division duplex (TDD)), a set of antenna ports, the type of transport channel associated with the transmission, an SOM associated with a transmission, a QoS requirement and/or parameter, or a HARQ-related property.

In an example of a channel vs signal and type/purpose of transmission, a WTRU may determine an applicable signal structure based on whether a transmission is associated with a physical channel or a physical signal. A WTRU may perform a determination based on the type and/or purpose of a physical channel (e.g., a physical control channel, a physical data channel, a physical data channel used to support a transport channel and/or random access channel) or of a physical signal (e.g., a synchronization signal, a system signature or a reference signal used for demodulation and/or sounding or channel state estimation.

In an example, the signal structure of a reference signal used for initial timing and frequency synchronization acquisition may have one or more properties including, for example, waveform type, sub-carrier spacing, cyclic prefix type and length (e.g., based on performance requirements of the carrier frequency offset correction), automatic gain control (AGC) and automatic Frequency Control (AFC) convergence, phase error estimate and/or initial timing determination. Requirements may be stringent, for example, when a WTRU performs initial synchronization in a cold start condition where the first signal structure may enable significant timing and frequency correction. For example, a cyclic prefix of the first signal structure may be large to accommodate uncertainty in channel delay spread.

A WTRU may acquire initial timing and frequency synchronization using, for example a first reference signal structure. The WTRU may enter (e.g., subsequently enter) a steady state. A WTRU may, for example, during a steady state, use a second signal structure to derive incremental correction, e.g., for the purpose of fine-tuning and tracking the established reference timing and frequency. In an example, a WTRU may use a second signal structure for a channel state information estimate. The signal structure may enable accurate channel reconstruction using a different sub-carrier spacing and cyclic prefix.

In an example, a WTRU may determine an applicable signal structure based on whether the WTRU is sending a transmission or receiving a transmission and/or whether the transmission is associated with an interface, a network node (e.g., an eNodeB) or a D2D/Sidelink interface (e.g., in communications with another WTRU). In an example, a signal structure applicable to a transmission may be determined based on a duplex mode, for example FDD or TDD. In an example of a set of antenna ports over which the transmission is received or transmitted, a WTRU may determine the applicable signal structure based on a beam width or precoding scheme corresponding to the set of antenna ports at the transmitter and/or at the receiver.

In an example of a QoS requirement and/or a QoS parameter associated with a transmission, a WTRU may determine an applicable signal structure based on applicability and/or configuration of a guaranteed maximum latency or guaranteed maximum time until the transmission may be deemed successful.

In an example, a WTRU may determine an applicable signal structure based on the status of QoS enforcement. For example, a WTRU may determine a second applicable signal structure for a given ongoing transmission based on the time left until the transmission is expected to have succeeded (e.g. according to a guaranteed maximum latency for the concerned transmission), for example, when the time left is less than a given (e.g., configured) threshold and/or when using a first signal structure.

In an example, a signal structure applicable to a transmission may be determined based on a HARQ-related property including, for example one or more of the following: (i) whether a transmission is an initial transmission or a retransmission, (ii) a retransmission number and/or (iii) a redundancy version. For example, a WTRU may determine that it may use a second signal structure upon reaching the maximum number of retransmission less a number x (e.g., a configurable number) for a given HARQ process, for example, when the WTRU has x transmission(s) left before the transmission may be deemed unsuccessful and/or when using a first signal structure.

A WTRU may determine an applicable signal structure for a transmission as a function of the outcome of a decoding attempt for a transmission, for example, a blind decoding. Examples of blind decoding may include one or more of the following: blind decoding where the outcome indicates a signal structure applicable to another transmission; blind decoding using different control channels; blind decoding using a single/different control channels, sets of DCI formats, radio network temporary identifier (RNTI), and/or SS; or blind decoding using different signal structure/numerology for blind decoding attempts.

For blind decoding where the outcome indicates a signal structure applicable to another transmission, a WTRU may use one or more of sets of parameters to decode a control channel. For example, a WTRU may determine that it successfully decoded downlink control information using a first set of parameters and may therefrom determine that a first signal structure is applicable to a transmission (DL and/or UL and/or SL, e.g., a transmission indicated/scheduled by the concerned control information). The downlink control information be a DCI on a physical downlink control channel (PDCCH) or a similar control information on a similar channel. The transmission may be a transmission on a data channel (e.g., a physical downlink shared channel (PDSCH), a physical uplink shared channel (PUSCH) or a similar channel), on a control channel (e.g., a second—associated or scheduled—uplink or downlink control channel, (e.g., a physical uplink control channel (PUCCH) or a similar channel, a second PDCCH or similar channel, or the likes) or a signal. The signal may be such as a sounding signal, a reference signal, or similar signal. A WTRU may determine that it has successfully decoded downlink control information (e.g., a DCI on a PDCCH or a similar control information on a similar channel) using a second set of parameters and therefrom determine that a second signal structure is applicable, e.g., to another transmission.

For blind decoding using different control channels a different set of parameters may be used to represent a first and a second control channel. For blind decoding using a single/different control channels, sets of DCI formats, radio network identifier (RNTI), and/or synchronization signal (SS), a different set of parameters may represent a first and a second set of parameters (e.g., DCI formats). A different set of parameters may represent a first and a second identifier (e.g., RNTI) and/or a scrambling code (e.g., applied for the decoding). A first RNTI may be of a first type (e.g., a dedicated RNTI, e.g., a cell RNTI (C-RNTI) or a similar RNTI), and a second RNTI may be of a second type (e.g. a common RNTI, e.g., a system information (SI-RNTI), a paging RNTI (P-RNTI) or similar RNTI). Different set of parameters may represent a first and a second set of resources used for the blind decoding (e.g., a search space). For example, a first search space may be a common search space, and a second search space may be a WTRU-specific search space. A single control channel scheduling different transmissions using different signal structure (e.g. TTI duration, BW, or others) for a given carrier may be used. The WTRU may determine from the outcome of the blind decoding what set of parameters and/or signal structure is applicable for the transmission indicated/scheduled by the received control information, e.g., the set of parameters associated with decoding of the control information may be the set applicable to the concerned transmission.

Blind decoding using one or more signal structures or numerologies for blind decoding attempts may use one or more of the following: (i) blind decoded parameters that indicate parameter set for a scheduled transmission (e.g., Transmission=DCI+parameters associated to blind decoding attempt); (ii) blind decoded parameters that apply at least partly to the scheduled transmission (e.g., Transmission=DCI+blind decoded parameters); or (iii) transmission=DCI, blind decoded parameters+associated parameters.

For blind decoded parameters that indicate parameter set for a scheduled transmission, a different set of parameters may represent a first signal structure and a second signal structure, e.g. at least associated to the concerned blind decoding process. A WTRU may perform blind decoding attempts using different numerologies (e.g., at least one of subcarrier spacing, CP duration, or similar) for each attempt. Blind decoding attempts may be performed using at least partly overlapping resources. For example, the resources may be overlapping in time and/or frequency. A WTRU may perform blind decoding attempts using resources (e.g., resources associated with different bandwidths for each attempt). A WTRU may perform blind decoding attempts using resources associated with different subcarrier spacing for each attempt. A WTRU may perform blind decoding attempts using resources associated with different time duration (e.g., in terms of symbols and/or in terms of symbol duration) for each attempt. The resources may represent control channel elements (CCEs) organized according to a concerned signal structure for the respective blind decoding. A WTRU may determine from the outcome of the blind decoding what set of parameters and/or signal structure is applicable for the transmission indicated/scheduled by the received control information. A WTRU may determine from successful blind decoding, for example, using a first signal structure that a first set of transmission parameters is applicable to the indicated/scheduled transmission.

For blind decoded parameters that apply at least partly to the scheduled transmission (e.g., Transmission=DCI+blind decoded parameters), a WTRU may determine from the outcome of the blind decoding what set of parameters and/or signal structure is applicable for a transmission indicated/scheduled by the received control information. The set of parameters (e.g., numerology, possibly including applicable subcarrier spacing, transmission duration, symbol duration, number of symbols, CP size, or similar) associated with the transmission that the WTRU successfully decoded and that included the control information may be part of the actual set of parameters applicable for the concerned indicated/scheduled transmission in combination with the scheduling information (e.g., a modulation and coding scheme (MCS), RBs, transmission mode or similar).

In an example (e.g., Transmission=DCI, blind decoded parameters+associated parameters), a WTRU may determine a subset of the parameters applicable to the concerned indicated/scheduled transmission from one or more of the following: the parameters used for blind decoding of the downlink control information (e.g., numerology-related aspects except the bandwidth applicable to the concerned transmission); parameters associated with the blind decoding process (e.g., a bandwidth and/or a physical data channel or SOM); or scheduling information inside the downlink control information.

A signal structure applicable to a transmission may be determined from its transmission power or a measurement used to derive a transmission power, such as the received power of a second transmission used to derive a path loss estimate. A WTRU may transmit using a signal structure including a single-carrier transmission, for example, when a path loss estimate or a transmission power exceeds a threshold. A WTRU may transmit using a signal structure including a multi-carrier transmission, for example, when a path loss estimate or a transmission power does not exceed a threshold. A threshold may depend on the expected peak-to-average power ratio and/or cubic metric associated with a (e.g., each) transmission.

A signal structure applicable to a transmission may be determined from: a transmission timing, a propagation delay, and/or a timing advance. A WTRU may transmit using a first signal structure (e.g., with a larger subcarrier spacing), for example, when the timing advance compared to a downlink signal is below a threshold. The WTRU may transmit using a second signal structure (e.g., with a smaller subcarrier spacing), for example, when the timing advance compared to a downlink signal is above a threshold.

A signal structure applicable to a transmission may be determined based on context information associated with a WTRU and/or a transmitting node or a receiving node. For example, a WTRU may determine a signal structure based on its geographical location, the geographical location of the node to/from which the transmission is destined or originates (e.g., when known) and/or the distance between the transmitting and receiving locations. A signal structure may be determined from a property associated with a node, such as an indication of a layer (e.g., a macro/coverage layer or a small cell layer).

A WTRU may determine or select a signal structure applicable to a first transmission from (or to) another node based on an indication (e.g., an explicit indication) received in a second transmission. The second transmission may have been received prior to the first transmission. A signal structure applicable to a second transmission may be pre-defined, configured by higher layers, determined blindly by a WTRU from a set of pre-defined and/or pre-configured signal structure candidates or determined according to other methods.

An indication may include at least one of: a downlink control signaling/information, layer 3 (L3)/RRC control information, a random access response (RAR), or L2/MAC control information. Downlink Control Signaling/Information may be indicated in a field in downlink or sidelink control information.

In an example where an indication may include a downlink control signaling or information, a field in downlink or sidelink control information may be received in a physical control channel (e.g. in a Downlink Control Information (DCI)) or multiplexed in a physical data channel (e.g., a random access response (RAR)), and/or a property thereof. The value of the field may indicate one of a set of signal structures that may be pre-configured or configured by higher layers. The location of control information (e.g., a first Control Channel Element (CCE), an identity of applicable search space, an identity of a control channel) may indicate an applicable signal structure.

In an example where indication may include L3/RRC control information, the indication may comprise an information element in a message from a control protocol, such as RRC or a higher layer protocol. For example, a signal structure or a set of parameters associated with a signal structure corresponding to a system signature may be indicated in a broadcast access table. Subsequent transmission and/or reception (e.g., random access preamble and response) may be performed using the indicated signal structure. A signal structure or a set of parameters associated with a signal structure may be indicated in an RRC message. Such a signal structure or a set of parameters may be applicable to transmissions at an operating frequency in on or more time or frequency resources.

An indication may be received in a random access response (RAR). A WTRU may select an applicable signal structure based on the selected random access response. In an example, a WTRU may determine or select the random access response based on indicated signal structure in a (e.g., each) random access response, as described herein. For example, the WTRU may make such determination based on type/requirement of data and/or of a service associated with a bearer (or equivalent) that may be served and suitable using the selected concerned signal structure.

An indication may include information transmitted or received using L2/MAC signaling, for example, a MAC control element (CE). A MAC CE using, for example, may be transmitted or received using dedicated MAC control and/or broadcast MAC control. In dedicated MAC control, a signal structure or a set of parameters associated with a signal structure applicable to transmissions at an operating frequency (e.g., for one or more time or frequency resources) or of a type may be indicated in a MAC CE. In broadcasted MAC control, a signal structure or a set of parameters associated with a signal structure corresponding to a system signature may be indicated in a broadcast access table. Subsequent transmission and/or reception (e.g., random access preamble and response) may be performed using the indicated signal structure.

A WTRU may indicate a signal structure applicable to a first transmission to another node by including an indication (e.g., an explicit indication) in a second transmission. A signal structure applicable to the second transmission may be pre-defined or configured by higher layers, for example, so that it is known by the intended receiver. An indication may include at least one of a field of uplink or sidelink information, an information element in a message from a control protocol and/or information carried over MAC signaling.

A field of uplink or sidelink control information may be transmitted in a physical control channel or multiplexed in a physical data channel. The value of the field may indicate one of a set of signal structures that may be pre-configured or configured by higher layers.

An information element in a message from a control protocol, such as RRC or a higher layer protocol, may include a message indicating a selected signal structure for operation with another node (e.g., network node or other WTRU) or a message indicating the set of possible signal structures that the WTRU is capable of operating with. Information carried over MAC signaling, from the WTRU, may comprise a MAC control element.

A signal structure applicable to a first transmission may be determined (e.g., determined implicitly) based on a property of the transmission or of a second transmission. The second transmission may be received earlier than the first transmission. For example, a WTRU may determine a signal structure applicable to a subframe, TTI or frame based on a property of a reference or synchronization signal received previously, for example at the beginning of the subframe, TTI or frame.

A WTRU may determine a signal structure applicable to transmissions associated with a system signature based on a property of the system signature. A transmission associated with a system signature may include at least the following: (i) broadcast system information, e.g., from an access information table, (ii) random access resources, e.g., preamble and/or random access response, mapped to the system signature, or (iii) transmissions configured by a random access response mapped to the system signature.

A WTRU may determine a signal structure applicable to transmissions associated with a system signature based on a property of the system signature, for example, the sequence (or a portion thereof) carried by the transmission of the system signature or the physical resource For example, the physical resource may be a resource in time and/or frequency associated with the transmission of the system signature.

A WTRU may determine a signal structure applicable to a first transmission based on the signal structure used for a second transmission. For example, a WTRU may determine that subcarrier spacing in a downlink control transmission corresponds to subcarrier spacing in a received reference signal preceding the transmission. A WTRU may determine that subcarrier spacing to be applied to an uplink transmission corresponds to subcarrier spacing in a previously received reference signal or in a previously received downlink control transmission.

A WTRU may determine a signal structure applicable to a transmission by estimating at least one parameter linked to the signal structure for this transmission, such as at least one of: (i) a subcarrier spacing, a symbol duration, and/or a cyclic prefix duration; or (ii) positioning of a reference signal in time and/or frequency.

A WTRU may determine a signal structure applicable to at least one transmission following the reception of an acknowledgment signal (or of a positive acknowledgment signal), based on a property of the last transmission from the WTRU preceding the acknowledgment signal. For example, a WTRU may transmit a first signal according to a signal structure (e.g., using a sub-carrier spacing). A WTRU may determine that a signal structure is applicable to subsequent transmissions from and/or to the WTRU, for example, when it receives a positive acknowledgment following transmission of the first signal, e.g., within a maximum delay or prior to the transmission of another signal by the WTRU. A signal structure applicable to an acknowledgment signal may be pre-defined or may correspond to a signal structure corresponding to the transmission of the first signal.

A WTRU may select a property of a reference or synchronization signal based on a signal structure to be applied to subsequent transmissions in a subframe, TTI or frame. The reference or the synchronization signal may be transmitted at an instance, for example, at the beginning of a subframe, a TTI or a frame.

A WTRU may select a signal structure applicable to a first transmission based on the signal structure to be applied for a second transmission. For example, a WTRU may select a subcarrier spacing of a reference signal to be transmitted based on the subcarrier spacing to be applied to subsequent transmissions. A WTRU may indicate a signal structure by selecting a set of possible random access (e.g., PRACH) resources and/or preambles corresponding to the signal structure and may transmit a random access signal from this set of resources and/or preambles. For example, a WTRU may select a preamble based on the preamble's signal structure being tied to the WTRU's indicated signal structure (e.g., the preamble may have the same signal structure as the indicated signal structure) or tied to the WTRU's indicated signal structure (e.g., the preamble may have a signal structure pointing to a different indicated signal structure). In an example, a WTRU may select a preamble based on a configurable or a fixed relationship between at least one parameter of the preamble including, for example, the sequence, the bandwidth of the preamble, the signal structure, the repetition level, or the transmit/receive beam, and the WTRU's indicated signal structure. A WTRU may indicate a signal structure by selecting the grant contained in a random access response corresponding to the signal structure and may perform a transmission according to this grant.

A property of a reference signal, synchronization signal and/or system signature may consist of at least one of the following: a parameter associated to a signal structure, at least one parameter out of a finite set of possible values used for the generation of the signal or signature, a frequency range (or band) where the signal or signature is found, or a time aspect of the signal or signature. For example, a WTRU may blindly detect a subcarrier spacing, symbol duration and/or cyclic prefix used in the system signature and may infer that the indicated signal structure has the same subcarrier spacing, symbol duration and/or cyclic prefix. For example, a parameter may include an index to a root sequence, such as Zadoff-Chu sequence or to an initial value used for generation of a pseudo-random sequence. A property may include a time aspect of a signal or a signature, such as a time when the signal or the signature is detected with respect to a certain time reference (e.g., from LTE cell or global navigation service such as GPS), the period or approximate period of repetition of the signal or signature or the duration of the signal or signature.

A WTRU may apply filtering on a transmission, for example, when the WTRU receives or transmits according to different signal structures at the same time in different frequency areas. Signal structure properties, such as subcarrier spacing of an OFDM waveform, may change and the symbol duration may change accordingly. For example, given the same system bandwidth, the number of subcarriers may change and may lead to a different DFT/IDFT size and sampling rate. A hardware ADC/DAC clock rate may be adjusted to accommodate the resulting changes. For example, the same FFT size may be maintained and down/up sampling, e.g., using polyphaser filtering such as a Farrow filter, may be applied. Changes may have a settling time. An eNB may, for example, schedule a gap between two different signal structures, e.g., to allow a WTRU to switch in time to a different signal structure. A gap may be absorbed in the CP field of the first signal structure and a WTRU may adjust the sampling rate during the CP field, e.g., before applying the second signal structure.

In an example, a WTRU may determine an applicable signal structure based on a received preamble and/or a sequence. For example, a time interval (e.g., a scheduling interval, a frame, a subframe, a TTI, or the likes) may start with a preamble, or a WTRU may be configured with one or more preambles. One or more preambles may be associated with one or more signal structures. In an example, a WTRU may receive (or transmit) a preamble whereby a preamble transmission may use a similar signal structure for a given channel. In an example, a WTRU may perform blind decoding of a preamble, and determine the applicable signal structure, for example, as described herein. A WTRU may determine, from the reception of a preamble, an applicable signal structure based on such association. A signal structure may be applicable for a time interval, e.g., a remainder of a concerned time interval. A WTRU may determine the applicable signal structure in an unlicensed band.

A WTRU may determine an applicable signal structure based on reception of one or more reference signals. A time interval (e.g., a scheduling interval, a frame, a subframe, a TTI, or the likes) may start with reference signals. One or more determined arrangements (e.g., antenna port, sequence index, scrambling sequence, phase reference, identity) and/or relationships between reference signals (e.g., in time and frequency) may indicate one or more signal structures. A WTRU may be configured with one or more arrangements and/or relationships. An arrangement may differ from one time interval to another. A different arrangement may be associated with a different signal structure. A WTRU may receive (or transmit) a reference signal arrangement whereby a reference signal(s) arrangement uses a similar signal structure for a given channel. The WTRU may perform blind decoding of a reference signal(s) arrangement. A WTRU may determine the applicable signal structure, for example, as described herein. A WTRU may determine from the reception of a reference signal(s) arrangement the applicable signal structure based on the association. The signal structure may be applicable for the concerned time interval, for example, a remainder of a concerned time interval.

Signal structure adaptation may be enabled. A WTRU or a network node may select a signal structure based on one or more of channel conditions, performance, service requirements, or other aspects.

A WTRU may report at least one measurement result taken from at least one measurement signal. The measurement result may be reported to a network node or another WTRU. Reporting may be performed at a physical layer, MAC layer, or RRC layer. The type of measurement may include at least one of the following: (i) a metric for the time (delay) dispersion of the channel, such as a delay spread or coherence bandwidth, or (ii) a metric for the variability in time of the channel, such as a Doppler shift, Doppler spread or coherence time.

A metric may be constructed from at least one estimate taken over at least one instance of the measurement signal. A metric may consist of a statistics, such as an average value, a maximum value, a minimum value and/or a root mean square value, for example, when more than one instance is used.

Reporting of a delay dispersion and/or time variability may allow an entity receiving the report (e.g., a network node or another WTRU) to perform adjustment to signal structure. For example, the adjustment may be performed for optimal performance.

A WTRU may maintain one or more values for a given metric. A value may be obtained from a different set of instances of the measurement signal. A set of instances may correspond to a particular frequency band, network node and/or a particular beamforming configuration at the network node and/or at a WTRU. The set to which an instance of the measurement signal belongs may be identified explicitly. For example, the set may be identified by downlink physical control signaling. The set may be identified implicitly, for example, based on a property of the measurement signal instance, such as timing, root sequence, scrambling sequence, mapping to resource elements, etc. For a set of instances, a WTRU may report a value (e.g., a different value) for the delay dispersion metric or the time variability metric. The set of instances may enable the entity receiving the report (e.g., a network node or other WTRU) to determine a signal structure for a particular frequency band, beamforming configuration, and network node. For example, the beamforming configuration may include a set of antenna ports at the transmitter and/or at the receiver, and/or a set of precoders.

A WTRU may be configured to report feedback measurements, for example, to enable support of multiple signal structures. In an example, a WTRU may be configured to dynamically change between signal structures. In an example, a WTRU may have different feedback resources to report measurements for each signal structure. In an example, a WTRU may reuse a set of feedback resources to report feedback for multiple signal structures. A WTRU may transmit a first feedback report type that may explicitly indicate to the entity receiving the report that future feedback reports are for a specific signal structure. The future feedback reports may be transmitting on resources tied to a parameter of the first feedback report type. For example, a WTRU may transmit in a first feedback report that one or more upcoming feedback reports are for a first signal structure until further notice, for example, until the first feedback report is updated. The receiving entity may assume feedback report types tied to the first feedback report type are for the first signal structure, for example, until the WTRU transmits a new feedback report type indicating to the receiving entity a change of signal structure.

A feedback report type indicating a signal structure for future feedback reports may be a new report type (e.g., a signal structure indicator (SSI)). In an example, a feedback report type indicating a signal structure for future feedback reports may reuse an existing report type. For example, one or more values of a feedback report type may be used to indicate a signal structure. The values may indicate toggling between a set of signal structures. For example, a 3-bit rank indicator may have seven codepoints to indicate values of rank and an eighth codepoint indicating a toggle in signal structure assumption for future feedback reports.

One or more measurement types may be implicitly reported. A WTRU may select a suitable signal structure, for example, based on one or more measurements performed on at least one measurement signal. A WTRU may indicate a selected signal structure in a transmission.

Enhanced channel state information (CSI) reporting may be used to recommend a signal structure. A WTRU may make a determination of a suitable signal structure for a transmission that would result. A WTRU may make a determination about other transmission parameters, such as modulation and coding scheme (e.g., channel quality indicator), transmission rank and/or precoding, in receiving the transmission with a certain pre-defined performance target (e.g., with a HARQ block error rate (BLER) of 10%). A signal structure determined to be suitable may be a recommended signal structure. For example, a WTRU may provide an indication of a recommended signal structure as part of channel state information (CSI) reporting in a physical layer. An indicated recommended signal structure may be one of a set of N possible signal structures pre-defined or configured by higher layers. Overhead for the indication may be small (e.g., log 2(N) bits, for N signal structures). Examples of factors that may be taken into account in the determination of a recommended signal structure are described herein. One or more measurement signals used in a determination may be configured as part of a CSI reporting configuration.

Figure 3:
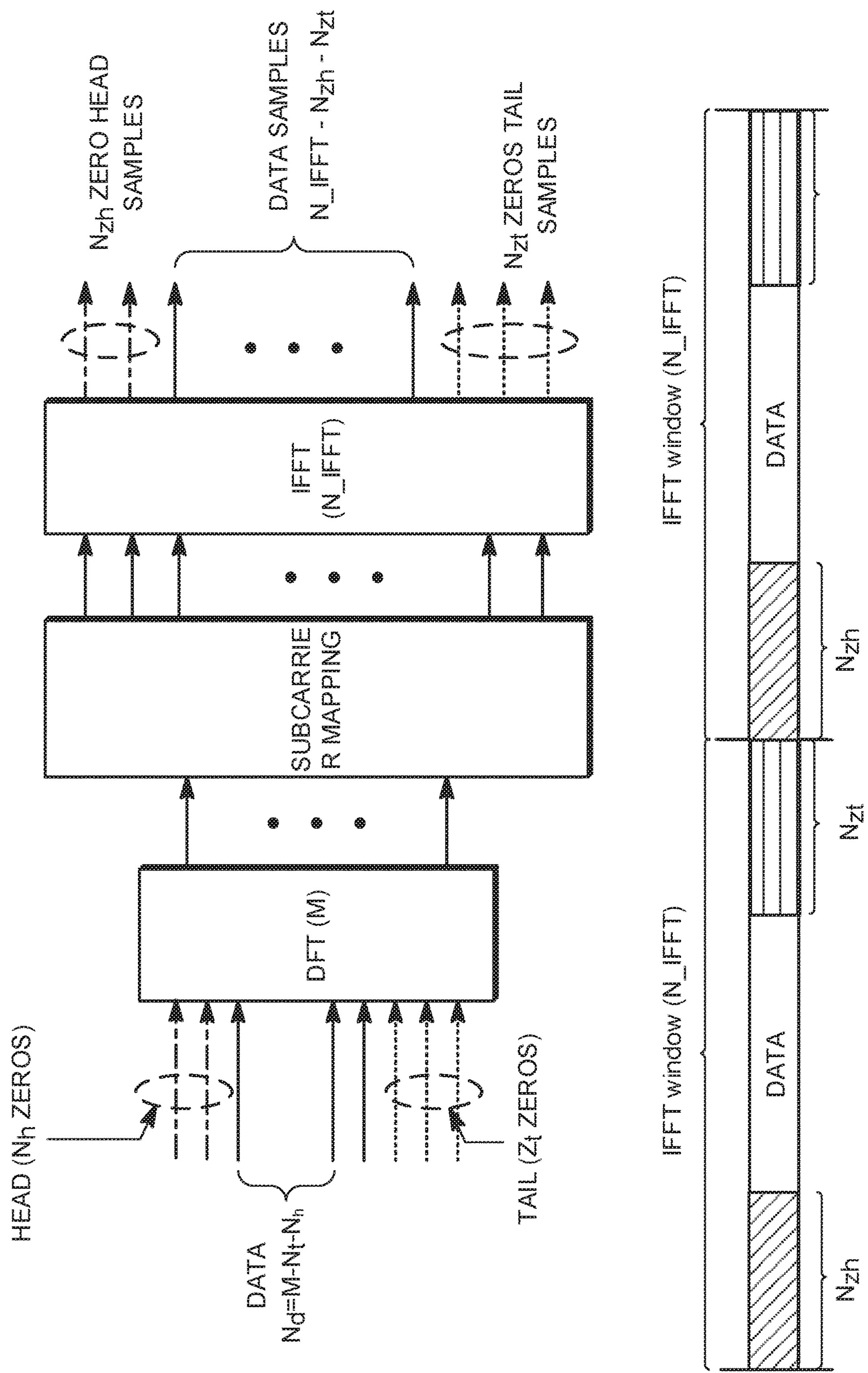
FIG. 3 is an example of using a zero tail discrete Fourier transform spread orthogonal frequency division multiplexing (ZT DFT-s-OFDM) waveform in a type of signal structure.

FIG. 3 illustrates an example of a zero tail discrete Fourier transform spread orthogonal frequency division multiplexing (ZT DFT-s-OFDM) system and a resulting waveform that may be used in a type of signal structure. As illustrated in FIG. 3, at the input of the DFT block, a number of zeros may be added to generate a low power tail at the output of the IFFT. This zero tail may be used to replace a fixed cyclic prefix (CP), for example, to account for the delay spread of the channel. The zero tail length (e.g., as part of the inverse fast Fourier transform (IFFT) output) may be dynamically tuned to adapt to the channel delay spread variation, for example, by changing the number of the zero inputs to the DFT block. A zero head field may be used by an eNB to smooth the transition between symbols and reduce out-of-band (OOB) emissions.

In an example with a ZT DFT-s-OFDM type of signal structure, CSI feedback may include an indication of measured channel delay spread, which may be in the form of an absolute time unit value or an index into a table of a pre-defined delay spread value range. CSI feedback may have an indicator corresponding to a pre-defined signal structure with a specific zero tail length. For example, a WTRU may measure and report a 200 ns maximum channel delay. An eNB may apply a signal structure with sub-carrier spacing of 75 kHz over a system bandwidth of 200 MHz. A signal structure may have 2400 sub-carriers, e.g., assuming 90% bandwidth efficiency, and may have a symbol duration of 13.33 us. An eNB may use a 4096-point IFFT/FFT. The signal structure may have 4096 samples per symbol. The eNB may set the zero tail at 1.5% of the symbol duration, 62 samples in the end of each symbol, for example, based on the reported 200-ns maximum channel delay.

A WTRU may calculate the root-mean-square (RMS) delay spread based on a number of measured channel delay profiles over time and may report the value to an eNB. The eNB may set the zero tail length according to a pre-configure rule, e.g., based on a number of multiples of the reported RMS delay spread.

An eNB may set a zero tail length based on CSI feedback and may explicitly signal a new zero tail length in downlink control information (DCI). In an example, an eNB may signal a differential value by using a bit field to indicate an increase or a decrease with a step size, for example, a pre-defined step size.

A WTRU may report a recommended signal structure for more than one process, for example, CSI processes. A process may be associated with a configuration of the measurement signal. A process or configuration may be associated with a particular frequency band, network node and/or a particular beamforming configuration at the network node and/or at the WTRU. The association may allow the network entity to adjust, e.g., dynamically adjust) the signal structure as a function of the transmitting network node and the beamforming configuration used at the network node and/or at the WTRU. In an example, a network may dynamically configure a shorter cyclic prefix (and/or larger subcarrier spacing), e.g., for a transmission involving narrow beams. The network may configure a longer cyclic prefix (and/or smaller subcarrier spacing), e.g., for a transmission involving wide beams, for example, when the delay spread may use a longer cyclic prefix. A WTRU may select a process or a configuration that may maximize performance and may report the recommended signal structure for this process or configuration. The WTRU may report an indicator of the selected process or configuration.

A recommended signal structure may be part of an enhanced scheduling request. A WTRU may transmit an access request (e.g., an enhanced scheduling request) to a cell. For example, a WTRU may transmit the access request for resources to transmit in the uplink (UL). The access request may include indication(s) for at least one of the following: (i) a need to be granted resources for transmission of data by the WTRU; (ii) one or more resources (e.g., time, frequency, and/or channel resources) on which the WTRU may transmit data; (iii) one or more QoS requirements, including, e.g., information about reliability of a transmission, maximum allowable latency or a minimum rate); (iv) a signal structure or numerology (e.g., a preferred or a required signal structure or numerology for the UL transmission); (v) a WTRU identifier; or (vi) a buffer status. A WTRU may transmit an access request on a first channel for UL transmissions or on a second channel, e.g. an unlicensed channel. An access request or an enhanced scheduling request may be transmitted in a contention based manner such as a resource shared by multiple one or more WTRU(s).

One or more indications as described herein may be explicitly included as an information element in an access request or an enhanced scheduling request. For example, an indication may be implicitly indicated by at least one of the following: (i) an enhanced scheduling request resource used; (ii) a type of code used for transmission of an enhanced scheduling request; or (iii) a demodulation reference signal parameter. For example, parameters like a sequence, a resource, an orthogonal cover code or a cyclic shift of a demodulation reference signal may indicate desired parameter(s) of UL transmission. A WTRU may have multiple enhanced scheduling request resources that may be contention based. The preference or use of a specific resource may indicate a signal structure to the network. A WTRU may be configured with a plurality of multiple access codes such as resource spread multiple access (RSMA) or sparse code multiple access (SCMA) codes. A code may be tied to an indication of a desired parameter of UL transmission.

A WTRU may indicate to a cell an indication for change in a signal structure for current or future transmissions. For example, a WTRU may provide feedback to the network to indicate an increase or a decrease in cyclic prefix duration or sub-carrier spacing. The indication may be provided via a bitfield signifying increase or decrease, and/or by a number of levels. For example a 2-bit field may indicate four states: 00—decrease by two levels, 01—decrease by one level, 10—remain the same, and 11—increase by one level. The levels of cyclic prefix, sub-carrier spacing, or signal structure may be pre-configured and known to the WTRU and the network.

An indication to adjust a signal structure may be transmitted, e.g., in one or more dedicated resources. A transmission may be performed periodically or aperiodically. For example, the transmission may be performed on-demand by the network. An indication may be transmitted in an enhanced scheduling request. An indication may be transmitted with a HARQ transmission. For example, a WTRU may indicate an acknowledgement (ACK) or a negative acknowledgement (NACK). The ACK or NACK may include a signal structure adjustment, which may be used in a retransmission. An indication may be transmitted in an uplink (UL) control region used by a WTRU to indicate parameters of a UL transmission. A UL control region may be pre-determined and may be a static or semi-static signal structure.

A WTRU may estimate channel delay spread based on a reference signal structure. For example, the reference signal structure may be for a wide bandwidth to provide time domain estimate resolution. A measured delay spread may be in units of actual time and/or number of samples.

A WTRU may feedback an absolute value indicating a delay spread to an eNB, and the eNB may adjust the number of zero inputs to a DFT block and may generate a recommended signal structure with a zero tail length corresponding to the reported channel delay spread. An eNB may determine a zero tail length in number of samples, e.g., depending on a signal structure's properties, such as subcarrier spacing and/or system bandwidth.

In an example, a WTRU may request an increase or decrease of a zero tail length with one or multiple step sizes, for example, in addition to or as an alternative to reporting an absolute value. The step sizes may be predefined. A step size may be of actual time unit or samples. Transmission of increase and decrease requests may be an up and a down command encoded in an uplink control channel.

A signal structure or a numerology may be adjusted following a period of inactivity. A network may receive information related to a WTRU's signal structure during a period of WTRU inactivity. The received information may be associated with a given WTRU or maintained separately for different sets of resources. For example, a WTRU may be configured with a set of resources where at least a first set and a second set of resources may be associated with a different signal structure, e.g., numerology blocks. In an example, a WTRU may be inactive for a period of time and may not provide information to the network about a preferred signal structure during the period of inactivity. For example, a WTRU may be configured to report signal structure adjustments in uplink control transmissions (e.g., UCI transmissions) following downlink transmissions.

A WTRU may be configured with a timer that may be applicable for a set of resources. The initial start value of the timer may be configured by upper layers for a set of resources. A WTRU may start or restart the timer when the WTRU performs an uplink transmission using the set for resources, for example, when the uplink transmission includes information related to a WTRU's signal structure requirement and/or adjustments. A WTRU may start or restart a timer when the WTRU receives a downlink transmission of a channel or signal. For example, the WTRU may start or restart a timer when the WTRU receives a downlink transmission that enables the WTRU to determine whether there is a need for a signal structure update/adjustment. In an example, a WTRU may start or restart a timer when the WTRU receives a downlink transmission and then determines there is no need for signal structure adjustment. A WTRU may start or restart the timer when the WTRU provides any type of signal structure feedback or indication or signal structure adjustment feedback or indication. If the WTRU determines that the timer has expired (e.g., due to a period of inactivity), the WTRU may initiate the transmission of a signal structure adjustment. The indication may be according to and/or using any of the signal structure indications described herein.

Upon expiration of the timer, the WTRU may transmit or expect to receive channels and/or signals, for example, using a configurable fallback signal structure. A signal structure, for example, a fallback signal structure may be tied to a previously used signal structure on the same set of resources. The fallback signal structure may be indicated by higher layer signaling.

In an example, a WTRU may receive a downlink control channel order (e.g., a PDCCH order) from a transmission/reception point (TRP) instructing the WTRU to transmit a signal structure adjustment (e.g., a current preferred signal structure or set thereof, or a measurement report) or to transmit a signal to enable the network to determine an appropriate signal structure. The received downlink control signaling may indicate the subset(s) of resources for which the request is applicable. The signal structure adjustments described may be applicable for one or more resources of a WTRU's configuration, for a subset of such resources, or for a set of resources that may correspond to a specific signal structure, e.g., a numerology block.

Signal structure may be selected during an access procedure. A WTRU may determine or select a suitable signal structure as part of an access procedure. The signal structure may allow subsequent communication with at least one network node. A determination or a selection of signal structure may take place according to at least one of the following: (i) a system signature; (ii) monitoring a control channel; (iii) transmission of grant from random access response; (iv) a recommendation using higher layer signaling (e.g., MAC or RRC signaling); or (v) a selection criteria for signal structure or a recommended signal structure.

In an example of determination or selection by system signature, a WTRU may use at least one system signature or other broadcast signal as measurement signals. The broadcast signal may be positioning reference signal or a broadcast system information. The WTRU may make a determination of a suitable signal structure intended to be used for subsequent communication based on one or more factors. The WTRU may make the determination, for example, after access procedure is completed. A WTRU may initiate access based on a system signature corresponding to a determined suitable signal structure. For example, a WTRU may decode a random access configuration corresponding to a selected system signature from broadcast system information. The broad system information may include an access table. The WTRU may initiate transmission on a random access channel based on the configuration. A signal structure used for broadcast system information may be pre-defined or may be determined, for example, as described herein.

In an example of selection by monitoring a control channel, a WTRU may be configured with at least one control channel configuration on which a random access response may be detected. The response may be detected, for example, following transmission on a random access channel. A control channel configuration may be indicated as part of a random access configuration corresponding to a system signature broadcast from system information. The system information may include an access table. A control channel configuration may be associated with a signal structure. A WTRU may make a determination of a suitable signal structure and may monitor a random access response on the configuration of the control channel associated with the suitable signal structure. For example, a random access configuration corresponding to a system signature may include two control channel configurations, for example, where one may correspond to a signal structure with a first value of a sub-carrier spacing (e.g., 15 kHz) and a second may correspond to a signal structure with a second value of a sub-carrier spacing (e.g., 75 kHz). A WTRU may make a determination to use the signal structure with a second value of sub-carrier spacing (e.g., 75 kHz) and may monitor the random access response, e.g., based on the corresponding control channel configuration. A random access response transmission may use a second signal structure or a pre-defined or a pre-configured signal structure.

In an example of selection by transmission of a grant from a random access response, a WTRU may be provided with (e.g., via an indication) a set of at least one signal structure in one or more random access responses. A signal structure may be associated with a grant to perform a transmission. A WTRU may make a determination of a suitable signal structure and may perform a transmission according to a corresponding grant. A grant may be provided in a random access response. The grant may be provided irrespective of indicated signal structures. A WTRU may indicate a suitable signal structure among the set in the payload of a grant, e.g., using MAC signaling via a MAC control element or RRC signaling.

In an example of selection/recommendation using higher layer signaling (e.g., MAC or RRC signaling), a WTRU may make a determination of a suitable signal structure, for example, upon reception of a first message from a network indicating a set of possible signal structures. The message may be an RRC message. A WTRU may indicate a selected suitable signal structure among the set in a second message.

An indication by a WTRU of a selected suitable signal structure may include a single signal structure, for example, the best or the WTRU's most suitable signal structure. In an example, a WTRU may indicate multiple suitable signal structures. An indication may include a ranking of signal structures, for example, to inform the network of the WTRU's most suitable or preferred signal structure.

An indication may include possible transmission or reception parameters tied to various signal structures, for example, different signal structures. For example, a WTRU may indicate one or more power headroom values for one or more signal structures to be used in UL transmission. In an example, a WTRU may have different demodulation performance for different signal structures to be used in DL transmission. The WTRU may have different requirements on demodulation parameters, such as density of demodulation reference signals.

A report of suitable signal structure may be initiated by a WTRU. For example, a WTRU may be triggered to transmit an updated list of suitable signal structures. The signal structures may have their own transmission and/or reception parameters. Triggers to initiate a report may include at least one of the following: (i) a measurement taken on a currently used signal structure; (ii) a measurement taken on an unused signal structure; (iii) a parameter tied to a currently used signal structure falling below or rising above a threshold; (iv) a parameter tied to an unused signal structure falling below or rising above a threshold; or (v) congestion in trying to access a channel using a currently configured signal structure. An example of (i) may be a signal structure in use by a WTRU for UL transmission or DL transmission falling below or going above a threshold. The measurement and the threshold(s) may be fixed or configurable. An example of (ii) may be a signal structure that is not currently in use by the WTRU for UL or DL transmissions falling below or rising above a threshold. The measurement and threshold(s) may be fixed or configurable. An example of a parameter in (iii) may be a transmission power for a signal structure becoming greater or lower than a threshold. With respect to (v), a WTRU may attempt to access an unlicensed channel using a signal structure and it may be unable to, e.g., due to congestion. A WTRU may be triggered to report a new list of suitable signal structures, for example, upon a number of failed attempts at accessing the channel. The number may be fixed or configurable.

A report of suitable signal structure may be included in a RRC message, for example, including a signal structure measurement report. In an example, a report of suitable signal structure may be included in a MAC control element.

A WTRU may use an information element in RRC signaling to indicate a selection of signal structure with desired or recommended CP or ZT length. In an example, a WTRU may report a desired or recommended CP or ZT length independent of signal structure selection.

In an example of selection criteria for signal structure or a recommended signal structure, a WTRU may make a determination of (or may select) a suitable signal structure or may make a determination of a recommended signal structure based on one or more of the following: (i) channel measurements, (ii) performance aspects, (iii) implementation aspects, (iv) service requirements, or (v) unlicensed operation aspects.

Channel measurements may be taken from at least one measurement signal, such as time variability of a channel, delay dispersion of a channel, path loss (or received signal power) measurement, required transmission power, and/or interference measurement.

In an example of time variability of a channel, a WTRU may determine that a signal structure to be suitable, for example, when a ratio of a metric of time variability (e.g., coherence time) to symbol time for a signal structure is not smaller than a threshold. A WTRU may determine that a signal structure is suitable, for example, when the ratio of a Doppler spread to sub-carrier spacing for a signal structure is not larger than a threshold.

In an example of delay dispersion of a channel, a WTRU may determine that a signal structure is suitable, for example, when the ratio of a metric of delay dispersion (e.g., maximum delay spread) to cyclic prefix duration or guard time duration for a signal structure is not larger than a threshold. In an example, a WTRU may determine that a signal structure is suitable, for example, when the ratio of the coherence bandwidth to the subcarrier spacing for a signal structure is not smaller than a threshold.

In an example of path loss or received signal power measurement, a WTRU may determine that a signal structure is suitable, for example, when the estimated path loss to a network node (or other WTRU) does not exceed a first threshold and/or is not lower than a second threshold. The threshold may be dependent on a parameter signaled by a physical, MAC or RRC layer. In an example, a signal structure based on OFDM may be suitable for uplink transmission, for example, when the path loss does not exceed a first threshold. In an example, a signal structure based on SC-FDMA may be suitable, for example, when the path loss does not exceed a second threshold but is larger than the first threshold, a signal structure based on single carrier transmission may be suitable otherwise.

In an example of required transmission power, a WTRU may determine that a signal structure is suitable, for example, when the required transmission power using that signal structure is achievable. For example, a WTRU may be able to use one of a set of signal structures for a UL transmission. For example, a WTRU may have a plurality of grants from which to select an appropriate one. A signal structure may have different transmission power requirements. A WTRU may select a signal structure or resources tied to a signal structure based on the required transmission power. For example, a WTRU may select a signal structure requiring the lowest transmission power. In an example, a WTRU may use a signal structure that may minimize the total amount of resources (e.g., fewest symbols or fewest subcarriers), when the required transmission power is achievable by the WTRU.

In an example of interference measurement, a WTRU may determine that a signal structure is suitable, for example, when the expected interference using that signal structure is below a certain threshold value. For example, a WTRU may operate in unlicensed spectrum and may perform some form of clear channel assessment before acquiring the channel. The clear channel assessment may be interpreted as an interference measurement. Different signal structures may have different interference thresholds. Thresholds used to determine whether clear channel assessment has passed may be signal-structure-dependent. Measurement threshold(s) used in the determination whether a WTRU is able to access a channel may be a function of the signal structure that may be used.

Performance aspects may comprise one or more of BLER, a number of retransmissions, inter-carrier interference (ICI) or inter-symbol interference USD, congestion, or full duplex operation. In an example of BLER, a WTRU may consider a signal structure to be suitable when the expected BLER achieves a signal-structure-specific expected BLER. In an (e.g. another) example, a WTRU may consider a signal structure to be suitable when the most recently measured BLER achieves a signal-structure-specific BLER.

In an example of a number of retransmissions, a WTRU may consider a signal structure to be suitable when the expected number of retransmissions achieves a signal-specific expected value. In an (e.g. another) example, a WTRU may consider a signal structure to be suitable depending on the retransmission value.

In an example of ICI or ISI, a WTRU may determine that a signal structure is suitable, for example, when the expected ICI and/or ISI are/is below a certain threshold value. A WTRU, for example in congestion, may determine that a signal structure is suitable, for example, when the WTRU is not expected to suffer congestion trying to access the channel using the signal structure. A WTRU may attempt channel access using a contention based method. A WTRU may select a signal structure based on the expected ability to successfully access the channel. In an example, a WTRU may determine that a signal structure is suitable, for example, when the amount of recently failed access attempts is below a threshold value. In an example, a WTRU failing a pre-determined number of attempts (e.g., consecutive attempts) to access a channel using a signal structure may not consider the signal structure suitable for a pre-determined period of time, or until further indication is provided to re-attempt using that signal structure.

In an example of full duplex operation, a WTRU operating in full duplex mode may consider a signal structure to be suitable, for example, when the WTRU is able to receive data on a resource on which it may also transmit. For example, a WTRU operating in full duplex mode may be granted UL transmission and assigned a DL transmission on a same resource. Performance of a WTRU's receiver may depend on the amount of self-interference present. A WTRU may select a signal structure (e.g. for UL and/or DL transmissions) that ensures self-interference is kept manageable or within an acceptable range. In an example, a WTRU may determine that a signal structure is suitable, for example, when the ratio of self-interference to transmit power is less than a threshold.

Implementation aspects may include, for example, WTRU capability and/or phase noise. In an example of WTRU Capability, a WTRU may have different signal structure capabilities that may be, for example, static or determined as a function of an operating frequency band. For example, a WTRU may determine that it is unable to demodulate transmissions on a frequency band using a signal structure, which may lead to a determination that the signal structure is not suitable.

In an example of phase noise, a WTRU may consider a signal structure to be suitable, for example, when the WTRU determines that the ratio of phase noise to sub-carrier spacing is below a pre-determined or pre-configured threshold.

Service requirements may comprise, for example, QoS, spectrum operation mode (SOM), buffer status, transmission type, etc. In an example of QoS, a WTRU may determine that a signal structure is suitable, for example, when achievable QoS is greater than a requirement. QoS may be determined as a function of reliability of latency. Reliability may be based on a transmission's ability to succeed, e.g., regardless whether a WTRU needs to preempt or interrupt it for another transmission. Achievable QoS may be measured based on past experience or an expected value for future transmissions.

In an example of SOM, a WTRU may determine that a signal structure is suitable, for example, when a SOM is pre-determined to be functional with a signal structure. For example, a WTRU may have an ability to transmit or receive transmissions of different types, for example, with each transmission having an associated SOM. A WTRU may select a signal structure, for example, depending on the type and/or SOM of each transmission.

In an example of buffer status, a WTRU may determine that a signal structure is suitable, for example, depending on the state of its transmission buffer for one or more bearers. In an example of transmission type, a WTRU may consider a signal structure to be suitable depending on the transmission type. For example, a transmission used for voice may use a first signal structure and a transmission used for data may use a second signal structure. In another example, a unicast transmission may use a first signal structure and a multicast (or broadcast) transmission may use a second signal structure. In another example, control plane transmissions may use a first signal structure and user plane transmissions may use a second signal structure.

Unlicensed operation aspects may include, for example, a parameter of unlicensed channel access and/or interference type, etc. In an example of a parameter of unlicensed channel access, a WTRU may determine that a signal structure is suitable, for example, based on one or more parameters of a function to access an unlicensed channel. For example, a WTRU may use a backoff window. A WTRU may deem a signal structure suitable, for example, depending on the backoff window size (e.g., a current size or a maximum size).

In an example of an interference type, a WTRU may consider that a signal structure is suitable, for example, based on the type of interference observed on an unlicensed channel. In an example, a WTRU may consider a first signal structure suitable, for example, when the interference observed on a channel is, or is primarily, from a first radio access technology (RAT) (e.g., Wi-Fi). A WTRU may consider a second signal structure suitable, for example, when the interference observed on a channel is, or is primarily, from a second RAT (e.g., LTE).

A WTRU may identify one or more suitable signal structures, e.g., based on the aspects provided herein or other aspects. A WTRU may select a sub-set of suitable signal structures. A WTRU may report or indicate one or more selected suitable signal structures based on at least one or more of the following: (i) maximizing or minimizing sub-carrier spacing (or symbol duration), (ii) minimizing cyclic prefix duration or cyclic prefix overhead, (iii) minimizing inter-carrier interference, (iv) minimizing inter-symbol interference, or (v) minimizing transmission power (average or peak).

A WTRU may perform transmission of at least one signal to enable another node to make a determination of a suitable signal structure. The node may be a network node or another WTRU. A WTRU may perform transmission of a measurement signal, for example, when one or more of the following conditions occurs or exists: (i) reception of a signal or indication from the network (e.g. in physical, MAC or RRC signaling), (ii) a timer has expired (e.g., a time alignment timer, a timer started when a transmission from the WTRU occurs, a timer started when a transmission to the WTRU occurs and/or a timer started at the previous instance of a measurement signal transmission), (iii) a scheduling request is triggered, or (iv) measurement results such as delay spread, Doppler spread, path loss (e.g., when the value of a measurement has changed by more than a certain amount and/or when the value of a certain measurement becomes higher or lower than a threshold). In an example, a first WTRU may be configured to transmit a sequence of different measurement signals, for example, to enable a receiver to determine the most suitable signal structure. The receiver may be a network node or another WTRU. A measurement signal in a sequence may be designed to allow determination of a suitable specific signal structure. For example, a measurement signal in a sequence may have a subcarrier spacing corresponding to subcarrier spacing of a specific signal structure. In an example, correspondence between a measurement signal of the sequence and an associated signal structure may be pre-configured for each measurement signal. A WTRU may be configured to transmit one or more of measurement signals during a period of time.

A network node or another WTRU may receive the one or more measurement signals and may determine from the set of received signals the most suitable signal structure. In an example, the network or another WTRU may determine the suitable signal structure based on the quality of the received signature. For example, the quality of the received signature may be determined based on signal-to-noise ratio (SNR) or other measurements. A network node or another WTRU may indicate to the first WTRU the signal structure that may be used, for example, using one or more of the approaches described herein. In an example, the network or another WTRU may select a signal structure other than one of the signal structures corresponding to the set of measurement signals transmitted by the first WTRU. Although described in the context of the uplink (or sidelink), this approach may also be used for downlink. In a downlink example, a network may be configured to transmit one or more measurement signals to a WTRU. The WTRU may determine the most suitable signal structure based on the received measurement signal. The WTRU may indicate to the network its preferred signal structure, for example, using one or more of the approaches described herein.

In an example, a WTRU may be configured to transmit one or more different measurement signals according to a pre-defined sequence, for example, in a ramp-up type of procedure. A sequence order may be configured by higher layers. An order may be pre-defined or defined in order of signal structure parameters, such as subcarrier spacing, cyclic prefix length, symbol duration, etc. A WTRU may, for example, after transmission of each measurement signal, monitor for a possible response from the network. In an example, a WTRU may not receive a response. In an example, a WTRU may receive an indication to continue the ramp-up procedure. A WTRU may transmit using the next measurement signal in the sequence. A WTRU may receive an indication to stop a ramp-up procedure. A WTRU may determine the signal structure applicable to subsequent transmissions as the one corresponding to the last transmitted measurement signal. A WTRU may determine the signal structure applicable to subsequent transmissions according to the received indication, for example, when an indication contains explicit information on the signal structure. A WTRU may complete the procedure and receive no response from the network. A WTRU may re-attempt the procedure after a certain amount of time, which may be fixed or random. The WTRU may be configured to use a default signal structure to attempt communication to the network. A similar procedure may be carried out on the downlink or with the sidelink. A WTRU may receive a sequence of signal structures and associated signatures. A WTRU may be configured to determine, based on one or more criteria, whether a received signal structure is suitable. A WTRU may determine that the signal structure is suitable. A WTRU may indicate its determination to a network node or other WTRU, for example, using the same signal structure or a default signal structure. A WTRU may be configured to transmit a negative indication, for example, when the signal structure received is not suitable.

A measurement signal transmitted or received by a WTRU may comprise, for example, a reference signal. The reference signal may be a demodulation reference signal, a channel state information reference signal, a sounding reference signal, a positioning reference signal, a node-specific reference signal, a synchronization signal, a system signature, etc. A measurement signal may be used for demodulation, synchronization, frequency tracking, etc.

A transmission received or transmitted by a WTRU may be used as a measurement signal. For example, one of the following may be used as a measurement signal: broadcast system information (e.g., an access information table), a random access response transmission, a transmission from a physical control, a physical data channel.

A signal structure applicable to a measurement signal may be dependent on the type of metric, for example, delay dispersion or time variability. The signal structure may be pre-defined, signaled by downlink control signaling, or configured by higher layers. For example, a signal structure applicable to a measurement signal used for measurement of delay dispersion or coherence bandwidth may be selected if the bandwidth of the measurement signal is larger than the maximum expected coherence bandwidth. A measurement signal may include a pulse in the time domain. The duration of the pulse may be smaller than an expected delay spread. A measurement signal may be a multi-carrier signal with a sub-carrier spacing. For example, the measurement signal may be an OFDM-based signal.

A WTRU may use a measurement signal structure to reconstruct a channel in time domain to obtain the maximum excessive delay, e.g., the channel length. A signal structure may have properties in a time domain and a frequency domain, for example, to provide sampling of the channel between each transmit and receive antenna pair. The resolution of channel delay measurement may depend on the bandwidth of a signal structure used for FFT-based channel delay measurement. For example, a signal structure with a 2-GHz bandwidth signal carrier waveform may have a resolution of 5 ns to resolve paths in time domain. In an example, a signal structure may use OFDM with sub-carrier spacing less than or equal to the coherence bandwidth. An eNB may allocate the signal structure in time and frequency domain to provide resolution of the channel dispersion measurement.

In an example, a signal structure applicable to a measurement signal used for the measurement of time variability (or coherence time) may be such that the duration of the measurement signal is larger than the maximum expected coherence time. A WTRU may sample a channel using a sampling rate less than the coherence time to reconstruct the channel. The channel coherence time may vary, for example, depending on WTRU velocity and Doppler spread. A WTRU may estimate Doppler spread using autocorrelation on cyclic prefix (CP) field. A signal structure with a reference CP length may be used. Length may be determined by the maximum expected Doppler spread. In an example, a signal structure may use a known sequence or unique word in the CP field.

A WTRU may measure a signal structure to obtain operational information including one or more of the following: (i) a first significant path (FSP) of the receive channel where the downlink reference timing may be based; (ii) a channel impulse response of each transmit/receive antenna pair; (iii) a delay, Doppler frequency, phase and AoA information of each detected path; (iv) an estimated velocity of a WTRU; (v) an SNR specific to certain properties of the signal structure (e.g., the bandwidth and precoding used); (vi) or a MIMO channel covariance matrix and Eigen channel coefficients that may provide further rank and precoder information. With respect to (i), a propagation channel may create multipath, e.g., echoes of the transmitted signal received at different delays. The first significant path may be the path (e.g., received above a threshold) that may be received earliest. A receiver may synchronize on that path. With respect to (ii), a channel impulse response may be measure for one or more paths coming from the same transmission node, where the FSP and WTRU may apply an internal threshold to qualify the paths. For example, a threshold may be defined where the energy detected for each path may not be lower than 20 dB below the FSP energy. With respect to (iv), an estimated velocity of a WTRU may be based on a phase estimate of a reference signal structure.

Systems, methods, and instrumentalities have been disclosed for aspects of determining signal structure in a wireless system. Signal structures may comprise transmission schemes and associated parameters. For example, a WTRU may identify a signal structure applicable to a first transmission based on a property detected from, for or based on a second transmission. Signal structure adaptation may be enabled or supported, for example, using one or more procedures, such as Link adaptation, WTRU reporting, Initial Access and/or CSI feedback. For example, a WTRU may provide (e.g., in feedback) a recommended signal structure, e.g., based on measurements and/or other factors and/or a WTRU may transmit measurement signals and/or measurement reports. A WTRU and/or a network may implement signal structure determination and/or support thereof in one or more layers, such as L1, L 2/3.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method implemented by a wireless transmit/receive unit (WTRU), the method comprising:

determining an operating band of the WTRU from among a plurality of frequency bands within a system bandwidth of a wireless system, wherein each of the plurality of frequency bands is associated with a respective set of signal structures;

determining the set of signal structures that is associated with the determined operating band, wherein the set of signal structures includes (1) a first signal structure including a first subcarrier spacing for a synchronization signal (SS) and (2) a second signal structure including a second subcarrier spacing for the SS, and the first subcarrier spacing is different than the second subcarrier spacing;

receiving the SS using a set of resources having one of the first subcarrier spacing of the first signal structure or the second subcarrier spacing of the second signal structure;

receiving and decoding a first physical channel transmission, which includes a master information block (MIB), using a set of resources having a same subcarrier spacing as the set of resources used for receiving the SS, wherein the MIB includes information indicating a third signal structure of a second physical channel transmission;

receiving and decoding the second physical channel transmission, which includes a system information block (SIB), using a set of resources having a third subcarrier spacing for the second physical channel transmission, wherein the third subcarrier spacing is based on the third signal structure and the SIB includes information indicating a fourth signal structure of a physical random access channel transmission; and sending the physical random access channel transmission using a set of resources having a fourth subcarrier spacing for the physical random access channel, wherein the fourth subcarrier spacing is based on the fourth signal structure.

2. The method of claim 1, wherein the first signal structure further includes a first placement in time and/or frequency of the SS in a subframe, and the second signal structure further includes a second placement in time and/or frequency of the SS in the subframe, and the first placement is different than the second placement.

3. The method of claim 1, wherein the third subcarrier spacing is based on the third signal structure and the operating band.

4. The method of claim 1, wherein the receiving of the SS is before the receiving of the first physical channel transmission.

5. The method of claim 1, further comprising:

after sending the physical random access channel transmission, receiving a radio resource control (RRC) message including information indicating a fifth signal structure; and sending a third physical channel transmission using a set of resources having a fifth subcarrier spacing based on the fifth signal structure.

6. The method of claim 1, further comprising:

after sending the physical random access channel transmission, receiving a radio resource control (RRC) message including information indicating a fifth signal structure; and receiving and decoding a third physical channel transmission using a set of resources having a fifth subcarrier spacing based on the fifth signal structure.

7. The method of claim 1, further comprising:

performing blind decoding to receive the SS using one of the first subcarrier spacing or the second subcarrier spacing.

8. A wireless transmit/receive unit (WTRU), the WTRU comprising:

a processor and a transceiver which are configured to:

determine an operating band of the WTRU from among a plurality of frequency bands within a system bandwidth of a wireless system, wherein each of the plurality of frequency bands is associated with a respective set of signal structures;

determine the set of signal structures that is associated with the determined operating band, wherein the set of signal structures includes (1) a first signal structure including a first subcarrier spacing for a synchronization signal (SS) and (2) a second signal structure including a second subcarrier spacing for the SS, and the first subcarrier spacing is different than the second subcarrier spacing, receive the SS using a set of resources having one of the one of the first subcarrier spacing of the first signal structure or the second subcarrier spacing of the second signal structure, receive and decode a first physical channel transmission, which includes a master information block (MIB), using a set of resources having a same subcarrier spacing as the set of resources used to receive the SS, wherein the MIB includes information indicating a third signal structure of a second physical channel transmission, receive and decode the second physical channel transmission, which includes a system information block (SIB), using a set of resources having a third subcarrier spacing for the second physical channel transmission, wherein the third subcarrier spacing is based on the third signal structure and the SIB includes information indicating a fourth signal structure of a physical random access channel transmission, and send the physical random access channel transmission using a set of resources having a fourth subcarrier spacing for the physical random access channel, wherein the fourth subcarrier spacing is based on the fourth signal structure.

9. The WTRU of claim 8, wherein the first signal structure further includes a first placement in time and/or frequency of the SS in a subframe, and the second signal structure further includes a second placement in time and/or frequency of the SS in the subframe, and the first placement is different than the second placement.

10. The WTRU of claim 8, wherein the third subcarrier spacing is based on the third signal structure and the operating band.

11. The WTRU of claim 8, wherein the processor and the transceiver are configured to receive the SS before the receiving of the first physical broadcast channel transmission.

12. The WTRU of claim 8, wherein the processor and the transceiver are configured to:

after the physical random access channel transmission is sent, receive a radio resource control (RRC) message including information indicating a fifth signal structure, and send a third physical channel transmission using a set of resources having a fifth subcarrier spacing based on the fifth signal structure.

13. The WTRU of claim 8, wherein the processor and the transceiver are configured to:

receive a radio resource control (RRC) message including information indicating a fifth signal structure, and receive a third physical channel transmission using a set of resources having a fifth subcarrier spacing based on the fifth signal structure.

14. The WTRU of claim 8, wherein the processor and the transceiver are configured to:

perform blind decoding to receive the SS using one of the first subcarrier spacing or the second subcarrier spacing.

* * * * *